United States Patent
Morita et al.

(10) Patent No.: US 7,952,594 B2
(45) Date of Patent: May 31, 2011

(54) INFORMATION PROCESSING METHOD, INFORMATION PROCESSING APPARATUS, AND IMAGE SENSING APPARATUS

(75) Inventors: Kenji Morita, Yokohama (JP); Yasuhiro Okuno, Setagaya-ku (JP); Hideo Noro, Setagaya-ku (JP); Akihiro Katayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1144 days.

(21) Appl. No.: 10/581,514

(22) PCT Filed: May 23, 2005

(86) PCT No.: PCT/JP2005/009820
§ 371 (c)(1),
(2), (4) Date: Jun. 2, 2006

(87) PCT Pub. No.: WO2005/116939
PCT Pub. Date: Dec. 8, 2005

(65) Prior Publication Data
US 2007/0132662 A1   Jun. 14, 2007

(30) Foreign Application Priority Data

May 27, 2004   (JP) .................................. 2004-158025
May 27, 2004   (JP) .................................. 2004-158026

(51) Int. Cl.
*G09G 5/00*   (2006.01)
*G06T 17/00*   (2006.01)
(52) U.S. Cl. ......... 345/633; 345/420; 345/629; 345/632
(58) Field of Classification Search .................. 345/633, 345/629, 632, 420
See application file for complete search history.

(56) References Cited

U.S. PATENT DOCUMENTS

| 5,923,333 | A | * | 7/1999 | Stroyan ......................... 345/422 |
| 5,999,185 | A | * | 12/1999 | Kato et al. .................... 345/420 |
| 6,118,427 | A | * | 9/2000 | Buxton et al. ................. 345/629 |
| 6,522,312 | B2 | | 2/2003 | Ohshima et al. .................. 345/8 |
| 6,545,663 | B1 | * | 4/2003 | Arbter et al. .................. 345/158 |
| 2002/0191862 | A1 | * | 12/2002 | Neumann et al. ............. 382/284 |

FOREIGN PATENT DOCUMENTS

| JP | 8-190640 | 7/1996 |
| JP | 11-161669 | 6/1999 |
| JP | 2003-044868 | 2/2003 |

OTHER PUBLICATIONS

Yuji Sato, et al., "Attention Sharing in MR Community Space-Enhanced Visualization System of User's Indication", The $6^{th}$ Virtual Reality Society of Japan Annual Conference, 2001, p. 235-238.

Masayuki Kanbara, et al., "Real-Time Composition of Stereo Images for Mixed Reality", ITE (The Institute of Image Information and Television Engineers) Technical Report, vol. 22, No. 33, 1998, p. 31-36.

* cited by examiner

*Primary Examiner* — Xiao M Wu
*Assistant Examiner* — David T Welch
(74) *Attorney, Agent, or Firm* — Fitzpatrick, Cella, Harper & Scinto

(57) ABSTRACT

The position and orientation of the viewpoint of an observer (100) are acquired. The position and orientation of a stylus (120) are acquired. A list image is laid out near the position of the stylus (120). An image of a virtual space after laying out the list image, which is seen in accordance with the position and orientation of the viewpoint, generated. The generated image is output to the display screen of an HMD (110).

11 Claims, 31 Drawing Sheets

```
CONSOLE MODULE
    ├─ LIQUID CRYSTAL DISPLAY PANEL
    │       ├─ LIQUID CRYSTAL MATERIAL
    │       └─ LIQUID CRYSTAL DISPLAY TEXTURE
    ├─ ONLINE BUTTON
    │       ├─ ONLINE BUTTON MATERIAL
    │       └─ ONLINE BUTTON TEXTURE
    ├─ DISCHARGE BUTTON
    │       ├─ DISCHARGE BUTTON MATERIAL
    │       └─ DISCHARGE BUTTON TEXTURE
    ├─ UP BUTTON
    │       ├─ UP BUTTON MATERIAL
    │       └─ UP BUTTON TEXTURE
    ├─ DOWN BUTTON
    │       ├─ DOWN BUTTON MATERIAL
    │       └─ DOWN BUTTON TEXTURE
    ├─ RIGHT BUTTON
    │       ├─ RIGHT BUTTON MATERIAL
    │       └─ RIGHT BUTTON TEXTURE
    └─ LEFT BUTTON
            ├─ LEFT BUTTON MATERIAL
            └─ LEFT BUTTON TEXTURE
```

F I G. 11
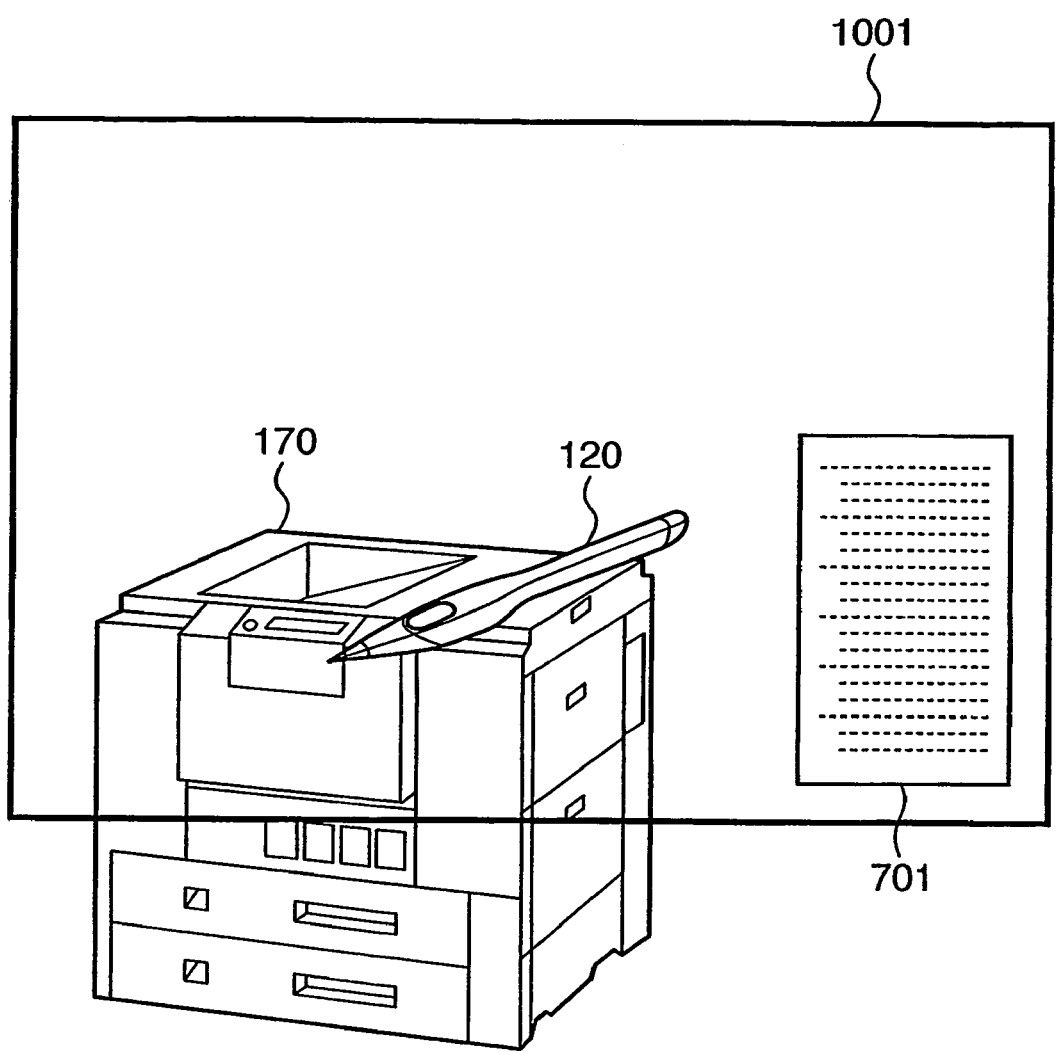

INFORMATION PROCESSING METHOD, INFORMATION PROCESSING APPARATUS, AND IMAGE SENSING APPARATUS

TECHNICAL FIELD

The present invention relates to a technique of generating an image of a virtual space formed from a virtual object including at least one part.

BACKGROUND ART

In a mixed reality system to present, to an observer, a known mixed reality space in which a physical space and a virtual space are blended, a position/orientation measuring device represented by FASTRAK (trademark) available from Polhemus (U.S.A.) is generally used to acquire the viewpoint position and the direction of line of sight in observing the mixed reality space (e.g., U.S. Pat. No. 6,522,312).

As an image sensing/display device, an HMD (Head Mounted Display) with a camera is often used. Stereoscopic vision by binocular parallax is also implemented by separately providing left and right image sensing systems and display systems in an HMD.

For the above-described mixed reality system, the present inventor has proposed a technique of laying out CAD data in a virtual space as a virtual object in the virtual space, generating an image obtained by viewing the virtual object from the viewpoint position and the direction of line of sight, and displaying the image on the display device provided on the HMD. When a virtual object corresponding to virtual CAD data is displayed in a physical space image, the viewpoint can easily and freely be moved. In addition, since the virtual object is composited with the physical space image, the sense of scale for the virtual object can be obtained, and more real display can be executed.

On the other hand, a conventional CAD system which uses no mixed reality system has an important function of displaying an assembly tree. Each part in a design target object is selected from an assembly tree and manipulated. When the assembly tree is used, a common operation can be executed at once for a plurality of integrated components.

However, in the mixed reality system, generally, the physical space image is displayed on the display device provided on the HMD. Hence, the display region to display various kinds of information is small. This also results from the small display area of the display device of the HMD.

When stereoscopic vision is implemented by using a stereo HMD, and an assembly tree is carelessly displayed, a sense of discomfort is generated in the stereoscopic vision.

DISCLOSURE OF INVENTION

The present invention has been made in consideration of the above-described problems, and has as its object to provide a technique for, when a virtual object including at least one part and superimposed on a physical space is presented to an observer, displaying information about the parts without damaging the sense of depth with respect to anther image.

It is another object of the present invention to provide a technique for, when a virtual object including at least one part and superimposed on a physical space image is presented to an observer, minimizing the problem of images occluded by display of information about the parts.

In order to achieve an object of the present invention, for example, an image processing method of the present invention comprises the following arrangement.

That is, an image processing method of generating an image of a virtual space formed from a virtual object including at least one part, characterized by comprising:

a first acquisition step of acquiring a position and orientation of a viewpoint of an observer;

a second acquisition step of acquiring a position and orientation of a pointing device which is worn by the observer on a hand to execute various kinds of operations;

a layout step of laying out a list image to display a list of pieces of information about the parts near the position acquired in the second acquisition step;

a virtual space image generation step of generating the image of the virtual space after laying out the list image, which is seen in accordance with the position and orientation of the viewpoint; and an output step of outputting the image generated in the virtual space image generation step to a predetermined display device.

In order to achieve an object of the present invention, for example, an image processing method of the present invention comprises the following arrangement.

That is, an image processing method of generating a virtual image corresponding to a position and orientation of an observer and compositing the virtual image with a physical image corresponding to the position and orientation of the observer, including acquiring the position and orientation of the observer, generating the virtual image in accordance with the position and orientation of the observer, and compositing the physical image corresponding to the position and orientation of the observer with the virtual image, characterized by comprising:

acquiring a position of pointing means operated by the observer;

identifying a part pointed by the pointing means;

generating a part information virtual image to display information about the identified part; and determining a layout position of the part information virtual image in accordance with the position of the pointing means.

In order to achieve an object of the present invention, for example, an image processing apparatus of the present invention comprises the following arrangement.

That is, an image processing apparatus of generating an image of a virtual space formed from a virtual object including at least one part, characterized by comprising:

first acquisition unit adapted to acquire a position and orientation of a viewpoint of an observer;

second acquisition unit adapted to acquire a position and orientation of a pointing device which is worn by the observer on a hand to execute various kinds of operations;

layout unit adapted to lay out a list image to display a list of pieces of information about the parts near the position acquired by the second acquisition unit;

virtual space image generation unit adapted to generate the image of the virtual space after laying out the list image, which is seen in accordance with the position and orientation of the viewpoint; and output unit adapted to output the image generated by the virtual space image generation unit to a predetermined display device.

In order to achieve an object of the present invention, for example, an image processing apparatus of the present invention comprises the following arrangement.

That is, an image processing apparatus of generating a virtual image corresponding to a position and orientation of an observer and compositing the virtual image with a physical image corresponding to the position and orientation of the observer, comprising:

acquiring unit adapted to acquire the position and orientation of the observer, generating unit adapted to generate the virtual image in accordance with the position and orientation of the observer, and compositing unit adapted to composite the physical image corresponding to the position and orientation of the observer with the virtual image, characterized by comprising:

acquiring unit adapted to acquire a position of pointing means operated by the observer;

identifying unit adapted to identify a part pointed by the pointing means;

generating unit adapted to generate a part information virtual image to display information about the identified part; and determining unit adapted to determining a layout position of the part information virtual image in accordance with the position of the pointing means.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 6 is a view showing an example of an image (list image) in which when a console portion 500 of a virtual object 170 of a copying machine is pointed by the stylus 120, pieces of information about the parts included in the console portion 500 are listed in a tree form (assembly tree);

FIG. 11 is a view showing an example of an image which is displayed on the display screen of the HMD 110 when the position and orientation of the viewpoint of an observer 100 are moved;

BEST MODE FOR CARRYING OUT THE INVENTION

Preferred embodiments of the present invention will now be described in detail in accordance with the accompanying drawings.

First Embodiment

In this embodiment, when the image of a virtual space formed from a virtual object including at least one part is superimposed on the image of the physical space and presented to the observer, pieces of information about the parts are also presented to the observer. A system to execute such presentation will be described below.

Figure 1:
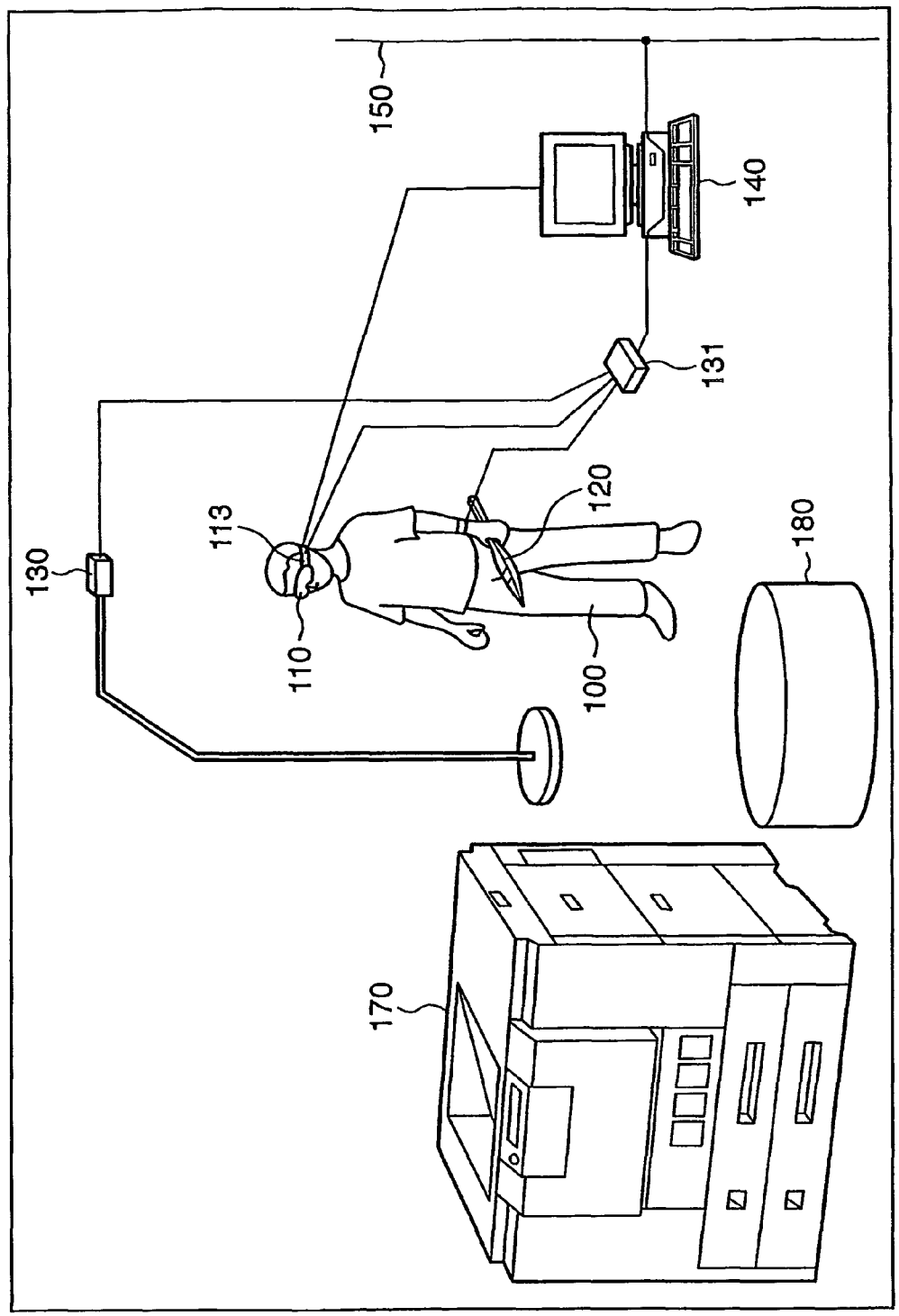
FIG. 1 is a view showing the outer appearance of a system according to the first embodiment of the present invention.

FIG. 1 is a view showing the outer appearance of the system according to this embodiment.

Referring to FIG. 1, reference numeral 100 denotes an observer. He/she wears an HMD (Head Mounted Display) 110 (to be described later) on the head and a stylus (pointing device) 120 (to be described later) in the hand ("wear" means both "hold in hand" and "attached to hand").

A position/orientation sensor transmitter 130 generates a magnetic field. A position/orientation sensor receiver 121 provided in the stylus 120 and a position/orientation sensor receiver 113 provided on the HMD 110 measure the magnetic field intensities corresponding to their positions and orientations.

A position/orientation sensor main body 131 controls the position/orientation sensor transmitter 130. The position/orientation sensor main body 131 also receives signals representing magnetic field intensities measured by the position/orientation sensor receivers 121 an 113 and obtains the position and orientation of each sensor receiver in the sensor coordinate system (coordinate system in which the origin is set at the position of the position/orientation sensor transmitter 130, and the three axes crossing each other perpendicularly at the origin are set as X-, Y-, and Z-axes) in accordance with the magnetic field intensity represented by the received signal. Data representing the obtained position and orientation is output to a computer 140 of the subsequent stage. As the sensor system, for example, FASTRAK (registered trademark) available from Polhemus (U.S.A.) can be used.

A virtual object 170 includes at least one part. The virtual object 170 in FIG. 1 is a copying machine. However, the present invention is not limited to this and can be applied to any other virtual object including at least one part. The virtual object 170 is illustrated in FIG. 1 for the descriptive convenience. Actually, only the observer 100 or the operator who is looking at the display screen of the computer 140 can see the virtual object. Reference numeral 180 denotes a physical object 180. The computer 140 executes data communication with an external device through a network line 150. The network line 150 is formed from a cable in FIG. 1. However, a wireless network can also be used.

The computer 140 obtains the position and orientation of the viewpoint of the observer 100 by executing processing (to be described later) on the basis of data from the position/orientation sensor main body 131. The computer 140 generates a virtual space image (virtual object image) which can be seen in accordance with the position and orientation of the viewpoint of the observer 100. The virtual space image includes a list image to display a list of information about parts included in the virtual object. The list image will be described later. The computer 140 executes processing of superimposing the generated virtual space image on the physical space image obtained from the HMD 110 and outputting the superimposed image onto the display screen of the HMD 110.

Figure 2:
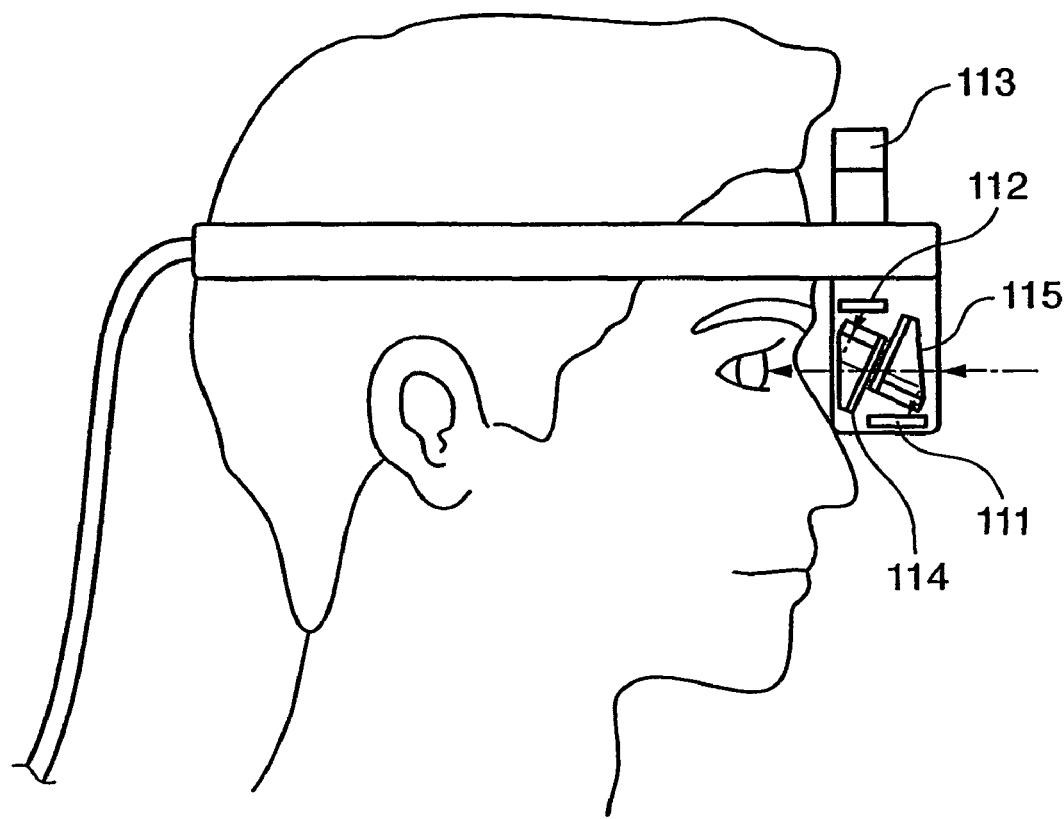
FIG. 2 is a view showing the schematic arrangement of an HMD 110 according to the first embodiment of the present invention.

FIG. 2 is a view showing the schematic arrangement of the HMD 110 according to this embodiment. As shown in FIG. 2, the HMD 110 includes a video camera 111, LCD 112, position/orientation sensor receiver 113, and optical prisms 114 and 115.

The video camera 111 senses light guided by the optical prism 115. As a result, the physical space seen in accordance with the position and orientation of the viewpoint of the observer is sensed. In this embodiment, a single video camera 111 is provided in the HMD 110. However, the present invention is not limited to this. To sense the physical space image seen in accordance with the position and orientation of each of the right and left eyes of the observer, two video cameras may be provided. The obtained image signal is output to the computer 140.

The position/orientation sensor receiver 113 measures the position and orientation of its own in the sensor coordinate system, as described above. Actually, the position/orientation sensor receiver 113 measures the magnetic field intensity corresponding to the position and orientation of its own. The position/orientation sensor main body 131 obtains the position and orientation of the position/orientation sensor receiver 113 in the sensor coordinate system on the basis of the measured intensity. Data representing the obtained position and orientation is output to the computer 140 of the subsequent stage. The position and orientation of the viewpoint of the observer 100 in the sensor coordinate system can be obtained by processing (to be described later) by the computer 140.

The LCD 112 receives the image signal generated by and output from the computer 140 and displays an image based on the received image signal. In this embodiment, an image (mixed reality spade image) obtained by superimposing the virtual space image generated by the computer 140 on the physical space image sensed by the video camera 111 is displayed. The displayed image is guided to the pupil of the observer by the optical prism 114.

Figure 3:
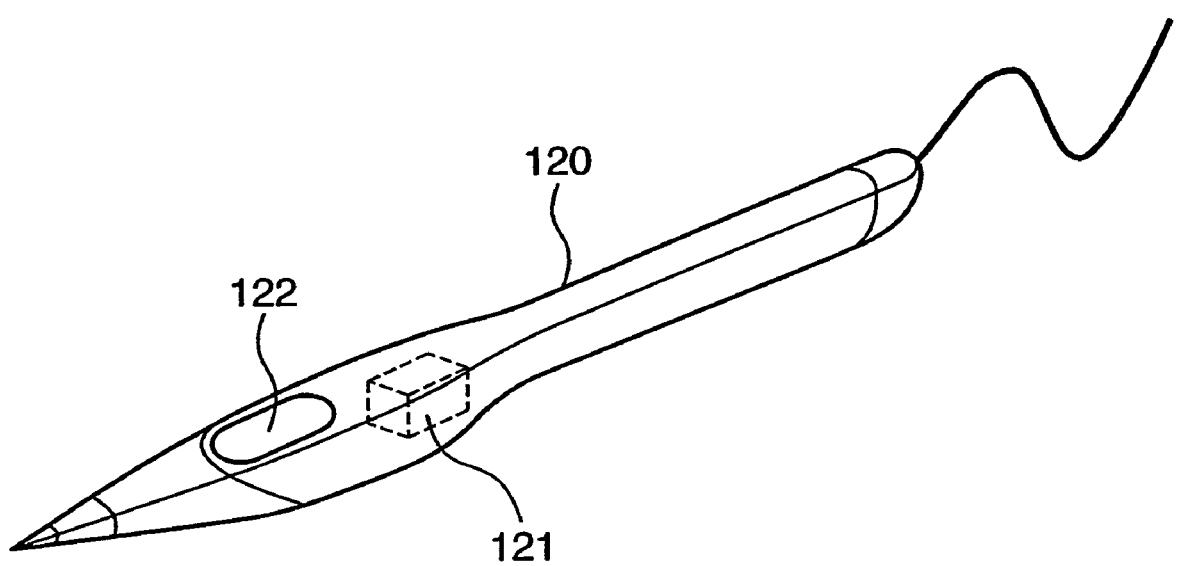
FIG. 3 is a view showing the structure of a stylus 120.

FIG. 3 is a view showing the structure of the stylus 120. As shown in FIG. 3, the stylus 120 comprises the position/orientation sensor receiver 121 and a stylus button 122. The position/orientation sensor receiver 121 measures the position and orientation of its own in the sensor coordinate system, as described above. Actually, the position/orientation sensor receiver 121 measures the magnetic field intensity corresponding to the position and orientation of its own. The position/orientation sensor main body 131 obtains the position and orientation of the position/orientation sensor receiver 121 in the sensor coordinate system on the basis of the measured intensity. Data representing the obtained position and orientation is output to the computer 140 of the subsequent stage. In this embodiment, the position and orientation of the position/orientation sensor receiver 121 are handled as the position and orientation of the stylus 120. However, the present invention is not limited to this.

The stylus button 122 can be set in the ON/OFF state by the operation of the observer 100. A signal representing each state is output to the computer 140 of the subsequent stage.

Figure 31:
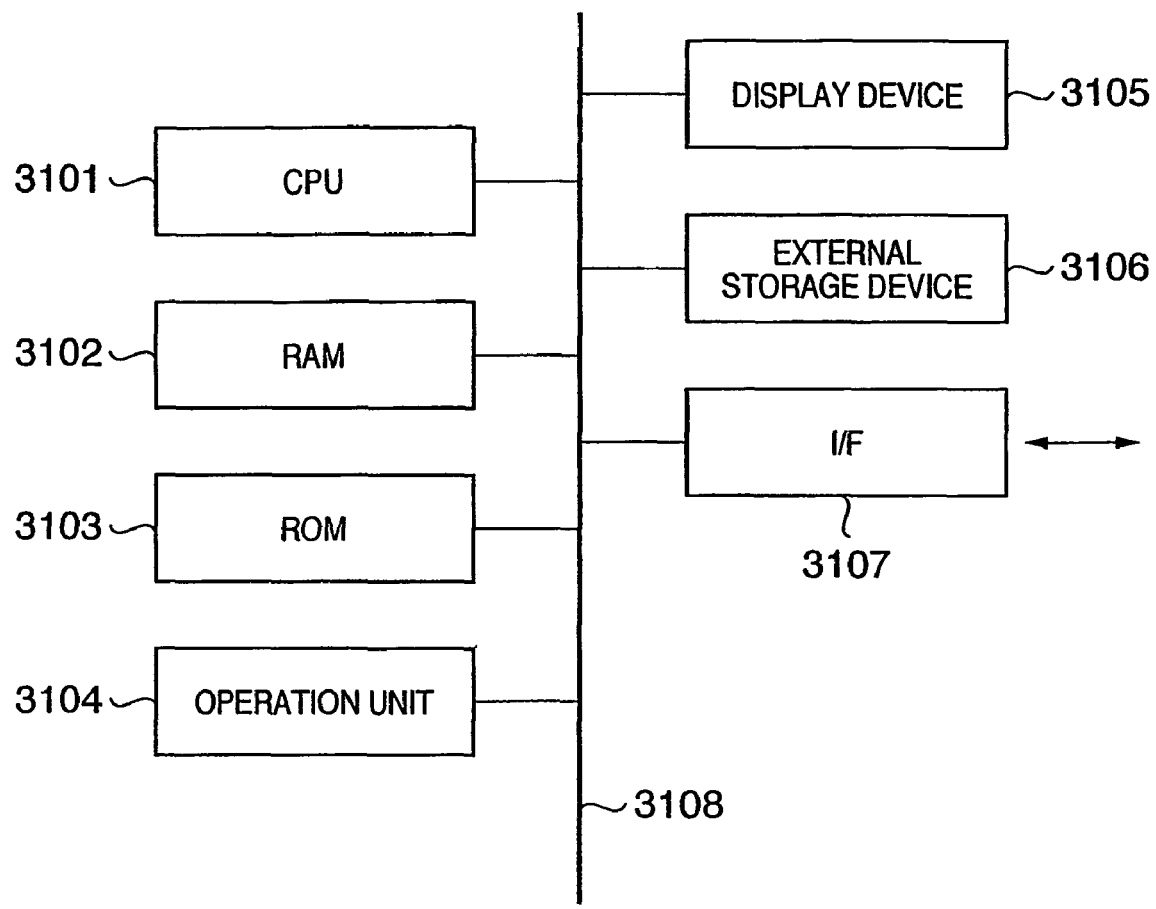
FIG. 31 is a block diagram showing the basic arrangement of a computer 140.

FIG. 31 is a block diagram showing the basic arrangement of the computer 140.

A CPU 3101 controls the entire computer 140 by using a program or data stored in a RAM 3102 or ROM 3103. The CPU 3101 also executes processing (to be described later).

The RAM 3102 has an area to temporarily store a program or data loaded from an external storage device 3106 and also a work area used by the CPU 3101 to execute various kinds of processing. The RAM 3102 also has an area to temporarily store data (e.g., data representing the position and orientation of the position/orientation sensor receiver in the sensor coordinate system, which is received from the position/orientation sensor main body 131, or physical space image data received from the video camera 111 of the HMD 110) received from an external device through an I/F 3107.

The ROM 3103 stores the boot program and data about setting of the computer 140.

An operation unit 3104 includes a keyboard and mouse and is used by the operator to input various kinds of instructions to the CPU 3101.

A display unit 3105 includes a CRT or liquid crystal panel and displays an image to be displayed on the display screen (LCD 112 in FIG. 2) of the HMD 110 or GUI to be used by the operator to execute various kinds of operations.

The external storage device 3106 is a mass storage device such as a hard disk drive. The external storage device 3106 stores a program or data to make the OS (Operating System) or CPU 3101 execute each processing to be described later. Some or all of the programs and data are loaded to the RAM 3102 under the control of the CPU 3101 and processed by the CPU 3101. Data stored in the external storage device 3106 includes a data group to generate a list image (to be described later) and data to generate an image of each virtual object (virtual object of copying machine in FIG. 1) which forms the virtual space. Information about each part included in the virtual object is held in association with data to generate the image of the part. Known data (information) in the following description is also stored in the external storage device 3106 and loaded to the RAM 3102 for use.

The I/F 3107 connects the computer 140 to an external device. The HMD 110, position/orientation sensor main body 131, and network line 150 can be connected to the I/F 3107. The I/F 3107 is simplified in FIG. 31 for the descriptive convenience. Actually, preferably, a plurality of I/Fs are provided in accordance with devices to be connected, and a target corresponding to each I/F is connected.

A bus 3108 connects the above-described units.

Processing of causing the computer 140 having the above-described arrangement to display a mixed reality space image on the display screen of the HMD 110 will be described next.

The video camera 111 provided in the HMD 110 always senses the image (moving image) of the physical space seen in accordance with the position and orientation of the HMD 110. The image of each sensed frame is sequentially output to the computer 140.

The position/orientation sensor transmitter 130 generates a magnetic field under the control of the position/orientation sensor main body 131. The position/orientation sensor receiver 113 of the HMD 110 and the position/orientation sensor receiver 121 measure the magnetic field intensities corresponding to their positions and orientations. Signals representing the measured intensities are output to the position/orientation sensor main body 131. The position/orientation sensor main body 131 obtains the position and orientation of each sensor receiver in the sensor coordinate system on the basis of the received signal. That is, the position and orientation of each sensor receiver in the sensor coordinate system are determined in accordance with the magnetic field intensity measured by the sensor receiver. The position/orientation sensor main body 131 outputs data representing the obtained positions and orientations to the computer 140.

Data of the physical space image from the HMD 110 and data representing the positions and orientations of the sensor receivers in the sensor coordinate system from the position/orientation sensor main body 131 are input to the RAM 3102 of the computer 140 through the I/F 3107.

The CPU 3101 converts the data representing the position and orientation of the position/orientation sensor receiver 113 in the sensor coordinate system into data representing the position and orientation of the video camera 111 in the sensor coordinate system by using offset data (data representing the position/orientation relationship between the position/orientation sensor receiver 113 and the video camera 111, which is measured in advance) loaded from the external storage device 3106 to the RAM 3102 in advance. The position and orientation of the video camera 111 in the sensor coordinate system will be handled as the position and orientation of the viewpoint of the observer 100 hereinafter.

The CPU 3101 lays out the virtual object 170 in the virtual space. The layout position and orientation are determined in advance by known data. The virtual object 170 includes at least one part, as described above. When the respective parts are laid out at predetermined positions and orientations, the virtual object 170 can be laid out in the virtual space. Processing of laying out a virtual object including at least one part in a virtual space is known, and a description thereof will be omitted.

The coordinate system in the virtual space shares the "origin and three axes" with the sensor coordinate system. That is, the sensor coordinate system matches the coordinate system of the virtual space. Hence, the CPU 3101 can generate the image of the virtual space seen from the position and orientation of the viewpoint of the observer 100 by using the data of the position and orientation of the viewpoint of the observer 100 and the data of the virtual space loaded from the external storage device 3106 to the RAM 3102 in advance.

The data of the virtual space is data about each virtual object which forms the virtual space. Data about a virtual object is data about each part included in the virtual object, including part shape data, texture data, and data representing the position and orientation. Data about a list image is also included in the data of the virtual space. Use of this data will be described later.

Processing of generating the image of the virtual space seen from predetermined position and orientation is known, and a description thereof will be omitted.

The generated virtual space image is superimposed on the physical space image stored in the RAM 3102 in advance. The superimposed image is output onto the display screen of the HMD 110 through the I/F 3107 as the mixed reality space image.

Figure 5:
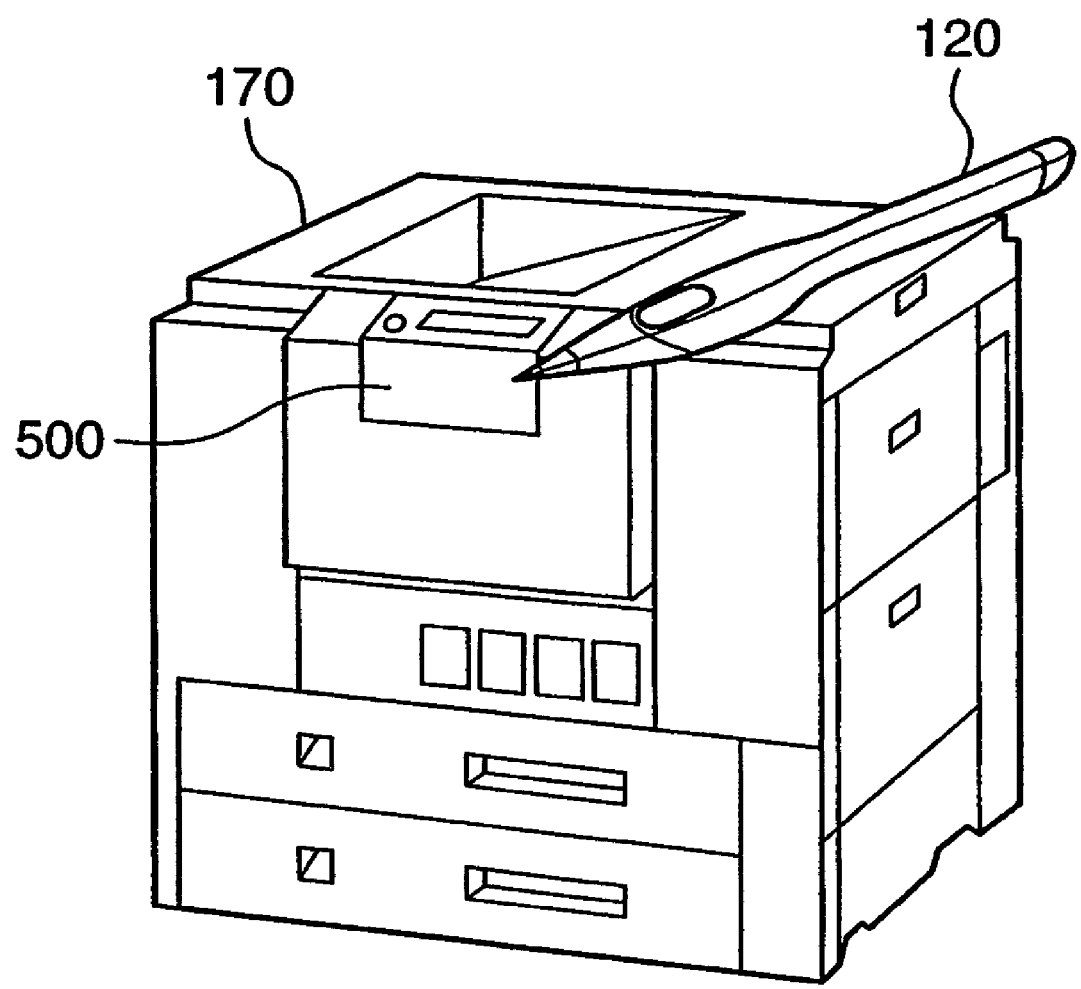
FIG. 5 is a view showing an example of the mixed reality space image.

FIG. 5 is a view showing an example of the mixed reality space image. The image shown in FIG. 5 includes the virtual object 170 of the copying machine in FIG. 1 and the stylus 120 as a physical object. In this embodiment, information about each part included in the copying machine is displayed together with the image.

For example, the operator moves the stylus 120 to one of the parts included in the virtual object 170 and presses the stylus button 122. A signal representing that the button is pressed is transmitted to the CPU 3101 through the I/F 3107. The CPU 3101 refers to data representing the position and orientation of the position/orientation sensor receiver 121 in the sensor coordinate system, which is stored in the RAM 3102, and specifies the part closest to the position. The data of the virtual object contains the position data of each part. By referring to this data, the part closest to the position of the stylus 120 is specified. If no part is present within a predetermined distance range from the position of the position/orientation sensor receiver 121, a signal representing that no part can be specified is sent to processing of the subsequent stage.

FIG. 6 is a view showing an example of an image (list image) in which when a console portion 500 of the virtual object 170 of the copying machine is pointed by the stylus 120, pieces of information about the parts included in the console portion 500 are listed in a tree form (assembly tree).

When the part closest to the stylus 120 is specified, and information about this part, which is associated with the specified part, is to be displayed, information about only the part can be displayed. Alternatively, since the parts included in the virtual object are generally managed in a parent-child structure (hierarchical structure) on the basis of the position/orientation relationship between the parts, information about all or some of parts corresponding to the children of the specified part may be displayed. The list image is laid out in the virtual space so that the information description plane can be seen from the position and orientation of the viewpoint of the observer 100. When the part closest to the position/orientation sensor receiver 121 cannot be specified (if no part is present within a predetermined distance range from the position of the position/orientation sensor receiver 121), the list image is not displayed.

Displayed information contains the material names and texture names of the parts (parts corresponding to the children of the console portion 500: liquid crystal display panel, online button, discharge button, up button, down button, right button, and left button in FIG. 6) included in the console portion 500 in FIG. 6. However, the present invention is not limited to this, and any other information may be displayed. As described above, information about each part is contained in the data of the virtual space in association with data necessary for generating the image of the part. For this reason, when the part pointed by the stylus 120 is specified, information about this part in the data of the virtual space can be referred to. Hence, the information to be described in the list image can be obtained.

The list image is displayed on the display screen of the HMD 110. The operator can refer to the information about the part pointed by the stylus 120 by referring to information of the list image. When the number of pieces of displayed information increases, the area of the list image also increases. Then, the virtual object 170 or physical space image is hard to see. In stereoscopic vision, when the list image three-dimensionally overlaps other virtual and physical objects, a sense of discomfort is generated in the stereoscopic vision.

In this embodiment, the list image is laid out near the stylus 120 in the virtual space and closer to the position of the viewpoint of the observer 100 than the stylus 120.

Figure 7:
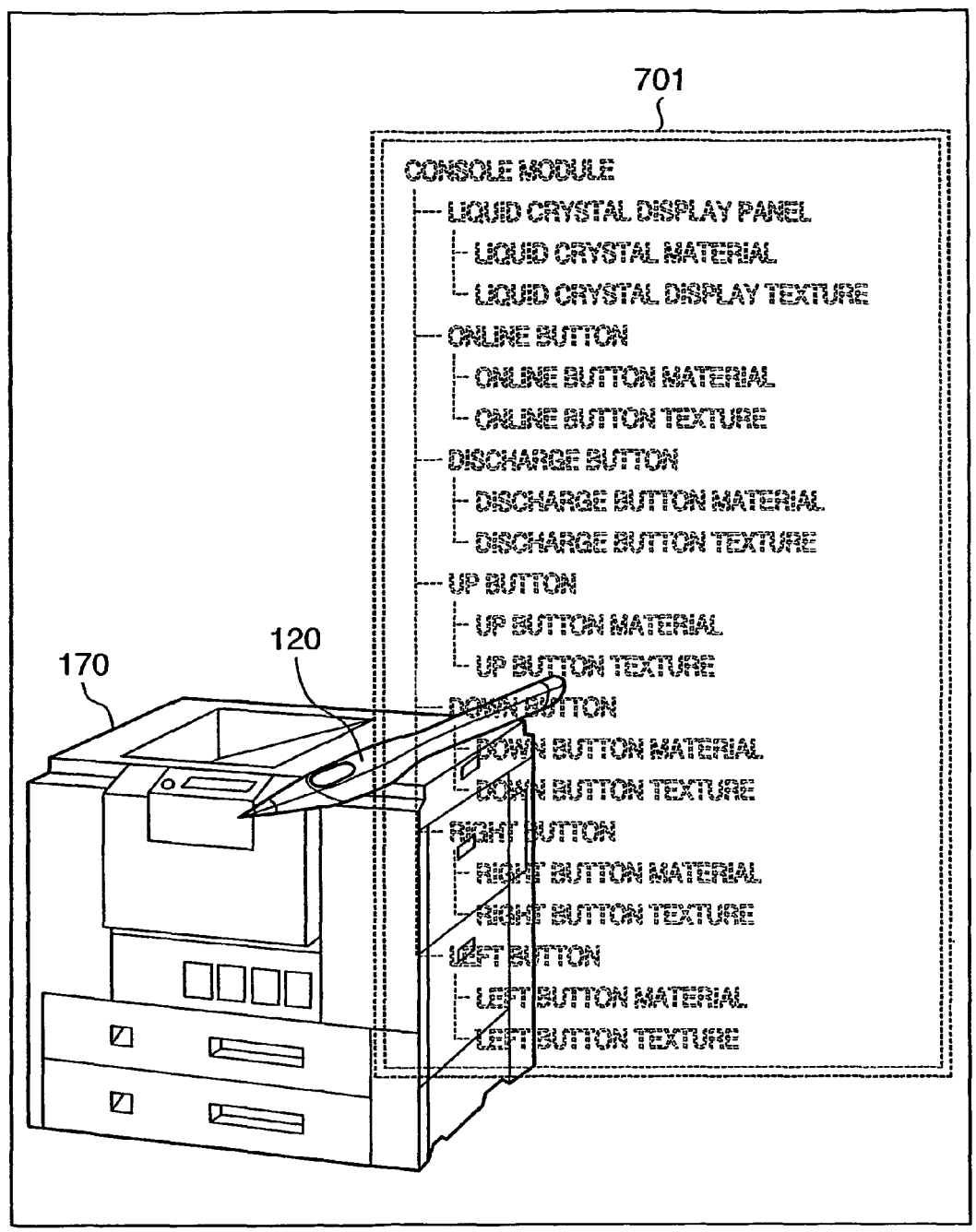
FIG. 7 is a view showing a display example of the mixed reality space image when the list image is laid out and displayed.

FIG. 7 is a view showing a display example of the mixed reality space image when the list image is laid out and displayed in the above-described way. Referring to FIG. 7, the list image is displayed in a semitransparent form and does not hinder the operator from seeing other images. Various techniques can be used to display an image in a semitransparent form. For example, a technique of controlling the α value of each pixel of the image can be used. These techniques are known, and a description thereof will be omitted.

In laying out the list image, for example, the list image is laid out at a position that internally divides the line segment connecting the position of the viewpoint of the observer 100 and the position of the stylus 120 to t:(1-t) such that the information description plane is seen from the position and orientation of the viewpoint of the observer 100. The orientation of the list image is set, e.g., the same as the orientation of the viewpoint of the observer. In this way, the position and orientation of layout of the list image are obtained by using the position and orientation of the observer and the position of the stylus.

As the value t, a value close to 1 as much as possible is preferably set such that the list image is located near the position of the stylus 120. After laying out the list image in the virtual space, the CPU 3101 generates, as a virtual space image, an image in which the virtual space including the virtual object and list image is seen in accordance with the position and orientation of the viewpoint of the observer 100.

When the list image is displayed in the above manner, the list image (assembly tree) is not occluded by another image practically. In addition, the list image is displayed at almost the same depth as the stylus 120 held in the hand. Hence, even in stereoscopic vision, no sense of discomfort is generated in the stereoscopic vision by binocular parallax by an extreme difference in the stereoscopic vision.

Figure 4:
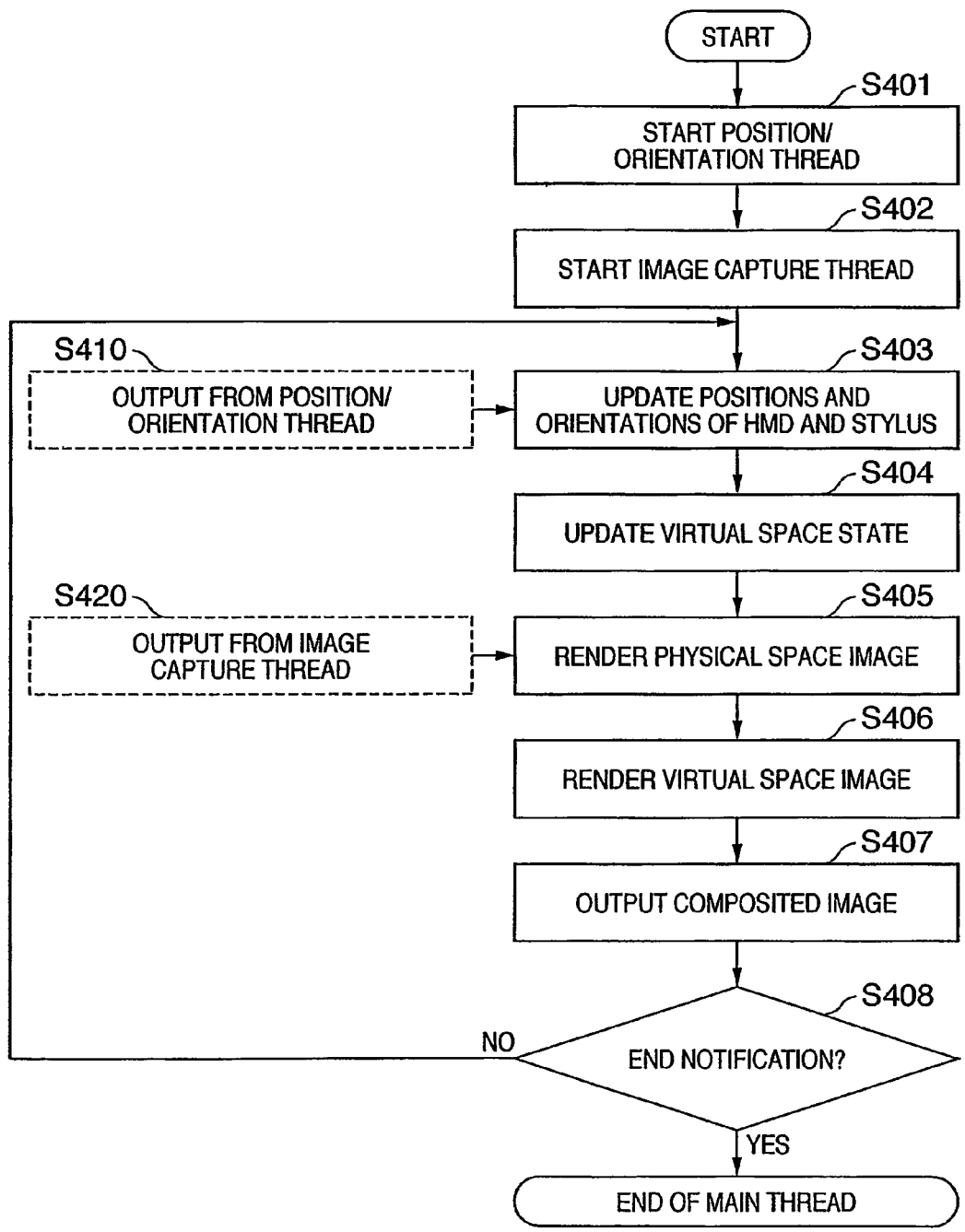
FIG. 4 is a flowchart of processing (main thread) of causing a CPU 3101 to generate the mixed reality space image and output it to the display screen of the HMD 110 according to the first embodiment of the present invention.

FIG. 4 is a flowchart of processing (main thread) of causing the CPU 3101 to generate the mixed reality space image and output it to the display screen of the HMD 110 according to this embodiment. The program to cause the CPU 3101 to execute processing according to the flowchart in FIG. 4 is stored in the external storage device 3106. The program is loaded to the RAM 3102 under the control of the CPU 3101 and executed by the CPU 3101. Known data in the above description is loaded from the external storage device 3106 to the RAM 3102 in advance.

The CPU 3101 activates the position/orientation thread (step S401) and image capture thread (step S402). A thread indicates a series of programs parallelly processed in the computer 140. Hence, information of, e.g., the operation mode is shared by the main thread and all threads.

In the position/orientation thread, the positions and orientations of the position/orientation sensor receivers 113 and 121 in the sensor coordinate system, which are received from the position/orientation sensor receivers 113 and 121 through the position/orientation sensor main body 131 and I/F 3107, are acquired (step S410). The CPU 3101 obtains the position and orientation of the viewpoint of the observer 100 in the sensor coordinate system by using the offset data and data representing the position and orientation of the position/orientation sensor receiver 113 in the sensor coordinate system and stores the data of the obtained position and orientation in the RAM 3102 (step S403). If data representing the position and orientation of the viewpoint of the observer 100 is already stored in the RAM 3102, the data is overwritten and updated.

The CPU 3101 also stores, in the RAM 3102, data representing the position and orientation of the position/orientation sensor receiver 121 in the sensor coordinate system (step S403). If data representing the position and orientation of the position/orientation sensor receiver 121 in the sensor coordinate system is already stored in the RAM 3102, the data is overwritten and updated.

Next the virtual space is updated (step S404). More specifically, when the virtual space changes its position, orientation, and color along with the elapse of time, the data of the position, orientation, and color are updated. In this embodiment, in step S404, the part closest to the position (i.e., the position of the position/orientation sensor receiver 121 in the sensor coordinate system) of the stylus 120 is specified. Only when the part is specified, information about the specified part is specified from the data of the virtual space.

In the example shown in FIG. 5, the stylus 120 is moved to the position of the console portion 500 of the virtual object 170 of the copying machine, and the stylus button 122 is pressed there. The CPU 3101 compares the position of the position/orientation sensor receiver 121 at this time with the position of each part included in the virtual object 170 of the copying machine to specify the part, i.e., console portion 500 closest to the position/orientation sensor receiver 121. The CPU 3101 specifies information about all parts corresponding to the children of the console portion 500 from the data of the virtual object 170 of the copying machine.

When the pieces of information about the parts are obtained, the list image shown in FIG. 6, in which the pieces of information are described, is generated. An example of this image will be described below.

A polygon is prepared for each information to be displayed. A texture which expresses information about one part by a character string image (created and stored in the external storage device 3106 in advance) is mapped to the polygon, thereby generating a planar virtual object with the description of information about the part. A planar virtual object is created for each part, and a list image (list image is also a planar virtual object) is created by connecting the planar virtual objects of the respective parts. Which polygon has information about which part is managed.

A thus generated list image is laid out at the position that internally divides the line segment connecting the position of the position/orientation sensor receiver 121 and the position of the viewpoint of the observer 100 to t:(1-t) such that the information description plane is seen from the position and orientation of the viewpoint of the observer 100.

That is, in step S404, the virtual object 170 and list image are laid out in the virtual space.

In the image capture thread, the physical space image obtained from the video camera 111 of the HMD 110 is acquired (step S420). The image is stored in a predetermined area of the RAM 3102 (step S405).

The virtual space updated in step S404, i.e., the virtual space image in which the virtual object 170 and list image laid out in step S404 are viewed from the position and orientation of the viewpoint of the observer 100 is superimposed on the physical space image stored in the predetermined area of the RAM 3102 in step S405 and rendered (step S406).

The image of a mixed reality space obtained by superimposing the virtual space image on the physical space image is generated in the predetermined area. The CPU 3101 outputs the obtained mixed reality space image to the display screen of the HMD 110 through the I/F 3107 (step S407). The mixed reality space image may be output to the display device 3105 and presented to the operator.

It is determined whether an instruction to end this processing is input through the operation unit 3104. If NO in step S408, the processing returns to step S403. If YES in step S408, the processing is ended.

Figure 9:
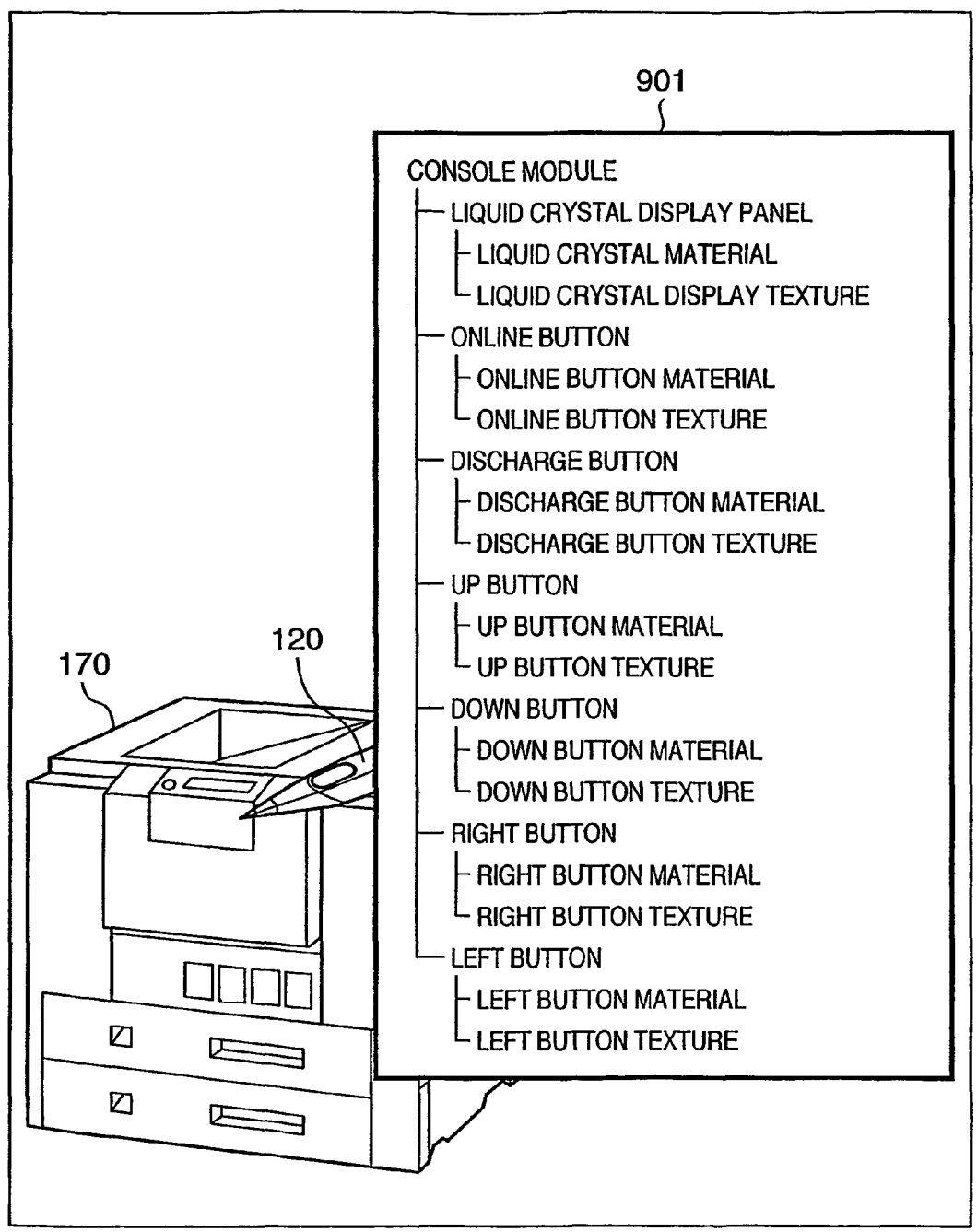
FIG. 9 is a view showing a display example of the mixed reality space image when the list image is laid out and displayed.

FIG. 9 is a view showing a display example of the mixed reality space image when the list image is laid out and displayed by the above processing.

As described above, according to this embodiment, information about each part included in the virtual object can be displayed without damaging the sense of depth with respect to anther image.

In this embodiment, the HMD 110 is of video see-through type. However, an HMD of optical see-through type may be used. In this case, the video camera 111 is unnecessary, and processing of inputting the physical space image is also unnecessary. Hence, the CPU 3101 executes processing without steps S402, S405, S420, and S407 in the flowchart shown in FIG. 4.

In this embodiment, to display the list image on the display screen of the HMD 110, the list image is laid out at the position that internally divides the line segment connecting the position of the position/orientation sensor receiver 121 and the position of the viewpoint of the observer 100 in the virtual space. That is, in this embodiment, the list image is handled as a 3D virtual object. However, the present invention is not limited to this, and the list image may be handled as a 2D image. In this case, the position of the position/orientation sensor receiver 121 may be projected onto a projection plane to display the image on the display screen of the HMD 110, and the list image may be displayed at (or near) the projection position. In displaying the list image, the virtual space image except the list image is superimposed on the physical space image, and the list image is displayed on the mixed reality space image in accordance with the flowchart shown in FIG. 4.

The list image may be displayed as a 3D virtual object in the display screen of the HMD 110 and as a 2D image in the display screen of the display device 3105 of the computer 140.

To project the image, a known projection conversion matrix to display an object in a virtual space onto a display screen is used. At this time, the list image may be a window in which pieces of information about parts are listed as a text.

Second Embodiment

In this embodiment, the display position of a list image is changed, and display is turned on/off in addition to the first embodiment. The main thread of the second embodiment is the same as in the first embodiment (according to the flowchart shown in FIG. 4) except list image display processing in step S404.

Figure 19:
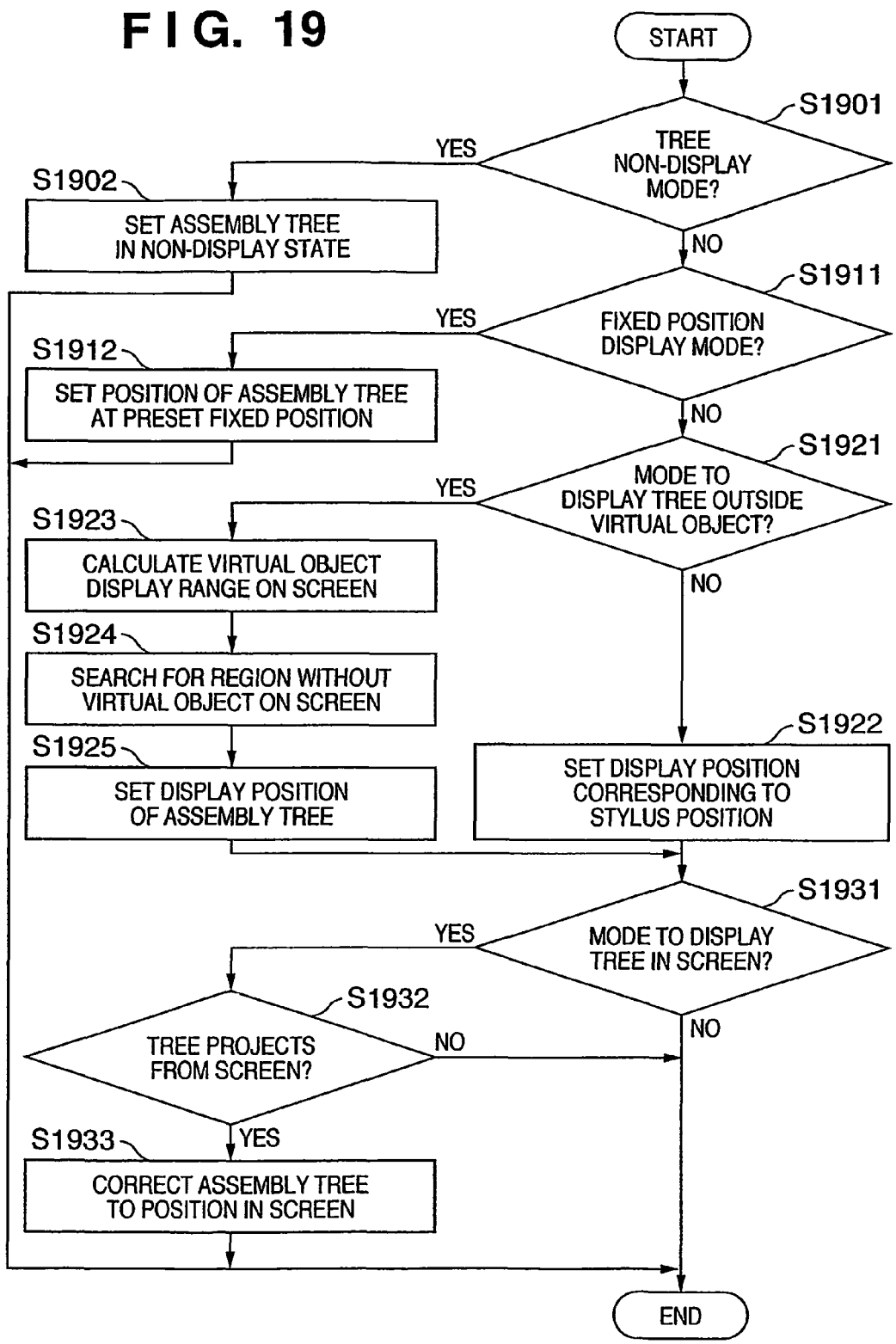
FIG. 19 is a flowchart of list image display processing according to the second embodiment of the present invention, which is executed in step S404.

FIG. 19 is a flowchart of list image display processing according to this embodiment, which is executed in step S404. Processing according to the flowchart shown in FIG. 19 is executed after the virtual object image is generated.

It is determined whether a mode to display a list image (assembly tree) is set (step S1901). This mode can be set by an operation unit 3104. Data representing the set mode is stored in a RAM 3102. Hence, in step S1901, it is determined by referring to this data whether the display mode or non-display mode is set. There are also various kinds of modes which can be set by the operation unit 3104, and data representing the set mode is stored in the RAM 3102. Hence, in determining a mode, it is determined by referring to the data whether the mode is set.

If the non-display mode is set, the processing advances to step S1902 to end the processing while keeping the list image in the non-display mode. In the non-display mode, layout of the list image is actually omitted. Alternatively, the list image is moved outside the display screen of an HMD 110 in the virtual space.

If the display mode is set, the processing advances to step S1911 to determine whether a fixed mode is set to display the list image at a fixed position on the display screen of the HMD 110 (sep S1911).

If YES in step S1911, i.e., the list image is to be displayed at a fixed position on the display screen of the HMD 110, the processing advances to step S1912 to display the list image at a predetermined position on the display screen of the HMD 110 (step S1912).

More specifically, the list image is laid out near a position spaced apart from the position of the viewpoint of an observer 100 in the direction of the line-of-sight vector (vector with an infinite length from the position of the viewpoint of the observer 100 to the direction defined by the orientation of the viewpoint) by a predetermined distance.

FIG. 11 is a view showing an example of an image which is displayed on the display screen of the HMD 110 when the position and orientation of the viewpoint of the observer 100 are moved. Referring to FIG. 11, reference numeral 1001 denotes a display screen. As shown in FIG. 11, even when the position and orientation of the viewpoint of the observer 100 move to see an object except a virtual object 170, the display position of a list image 701 does not change according to the processing in step S1912.

If NO in step S1911, the processing advances to step S1921 to determine whether a mode to display the list image outside the display region of the virtual object on the display screen of the HMD 110 is set (step S1921). If NO in step S1921, the processing advances to step S1922 to execute processing of laying out the list image near the position of a stylus 120, as in the first embodiment (step S1922).

Figure 10:
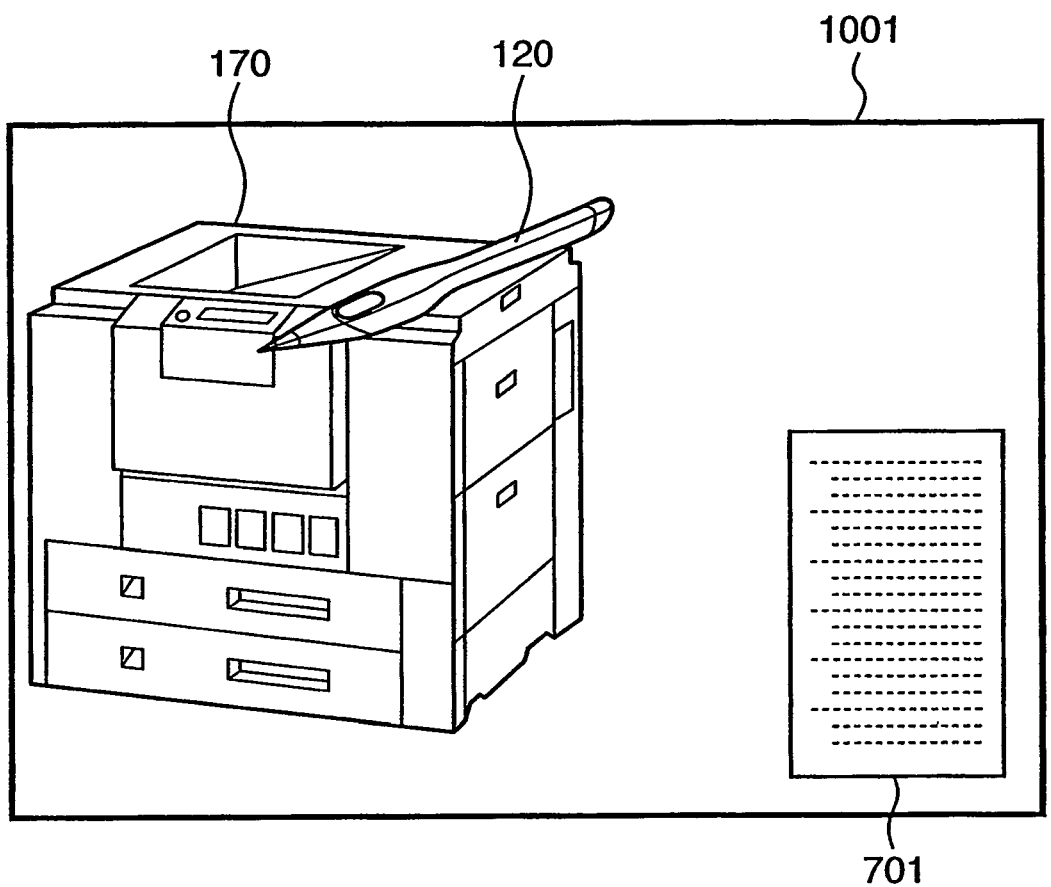
FIG. 10 is a view for explaining a region where no virtual object is displayed.

If YES in step S1921, the processing advances to step S1923 to specify the display region of the virtual object on the display screen of the HMD 110 (step S1923). A region except the region specified in step S1923 is specified on the display screen of the HMD 110 (step S1924). For example, in the display screen shown in FIG. 10, the right region is the region where no virtual object is displayed.

Figure 12:
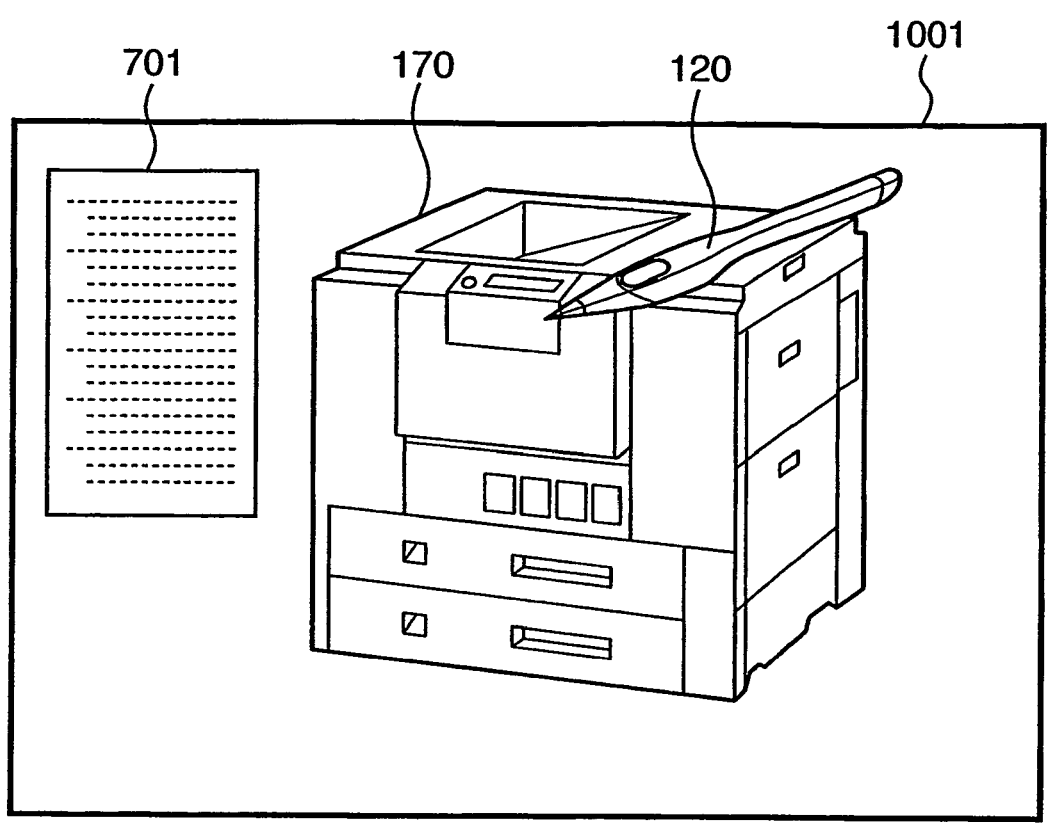
FIG. 12 is a view showing a display example of the list image which is laid out without overlapping the display region of the virtual object 170.

The list image is laid out in the virtual space such that the list image is displayed at an appropriate position (e.g., position at which the overlap region between the list image and the display region of the virtual object is minimized) in the region specified in step S1924, i.e., in the region except the display region of the virtual object on the display screen of the HMD 110 (step S1925). For example, the projection position at the appropriate position in the virtual space on the display screen of the HMD 110 is obtained by executing back projection conversion for the appropriate position, and the list image is laid out at (or near) the obtained position. As a result, as shown in FIG. 12, the list image can be laid out without overlapping the display region of the virtual object 170.

As an example of the detailed processing in steps S1923 to S1925, the rendering range of the virtual object on the display screen is calculated by using a matrix (known matrix used for display) to project the virtual object on the display screen. A position on a plane perpendicular to the nearest line of sight outside the calculated range is calculated as the display position of the list image. As another example, the direction from the position of line of sight (position of HMD 110) to the central point of the virtual object and the angle from the direction to center, at which the virtual object overlaps the list image, are calculated, and the nearest position outside the angle is calculated as the display position of the list image.

In displaying the list image in stereoscopic vision, stereoscopic perception can be difficult depending on the display depth. When the list image is displayed in a region which does not overlap the virtual object, display easy to see without sense of discomfort can be implemented by locating the list image at a depth in the same range as display of the virtual object.

Referring back to FIG. 19, it is determined next whether a mode to place the list image in the display screen of the HMD 110 is set (step S1931). If YES in step S1931, the processing advances to step S1932 to check whether the list image laid out at the layout position determined in step S1925 projects from the display screen of the HMD 110 (step S1932). This check is done by checking, e.g., whether when the coordinate values of the four corners of the list image in the virtual space are projected in the display screen of the HMD 110, the values are placed in the display screen.

If the list image projects from the display screen, the processing advances to step S1933 to move the layout position of the list image in the virtual space such that the coordinate values of the four corners of the list image are placed in the display screen of the HMD 110 (step S1933).

With the above-described function, even when the operator is unskilled in operating the stylus or system, the assembly tree can properly be displayed.

Third Embodiment

In this embodiment, a function of making the list image displayed in the first embodiment semitransparent is added.

Figure 8:
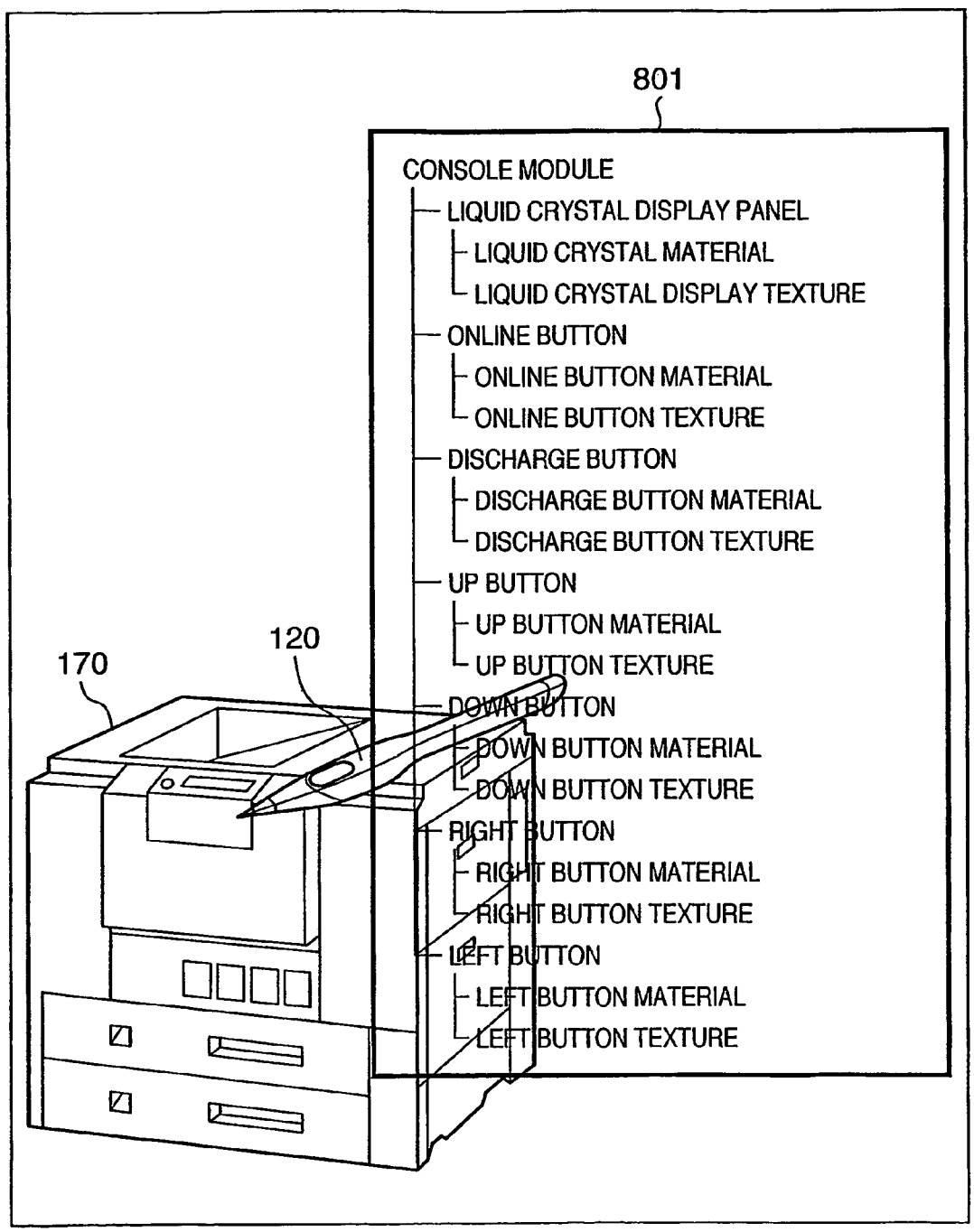
FIG. 8 is a view showing a display example of a list image 801 having a completely transparent background and opaque characters.

FIG. 8 is a view showing a display example of a list image 801 having a completely transparent background and opaque characters. The characters may be hard to read depending on the background. However, when the list image shown in FIG. 8 is employed, images other than the list image are easier to see than the example shown in FIG. 7.

Figure 20:
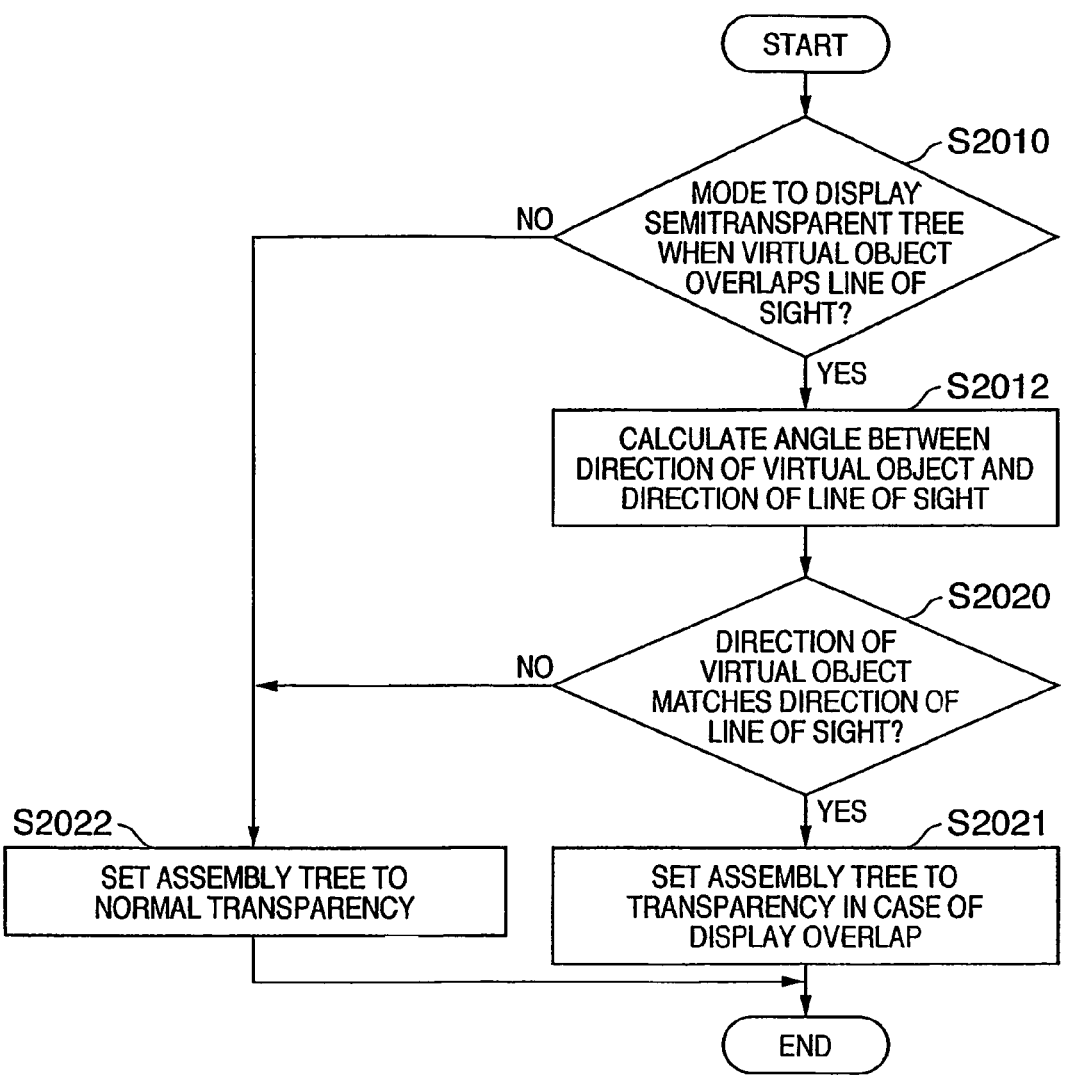
FIG. 20 is a flowchart of list image display processing according to the third embodiment of the present invention, which is executed in step S404.

FIG. 20 is a flowchart of list image display processing according to this embodiment, which is executed in step S404. In this embodiment, the list image is a 3D virtual object, as in the first embodiment. However, it may be a 2D image, as in the second embodiment.

When a virtual object is present in the direction of line of sight of an observer 100, it is determined whether a mode to display a semitransparent list image is set (step S2010). This mode can be set by an operation unit 3104. Data representing the set mode is stored in a RAM 3102. Hence, in step S2010, it is determined by referring to this data whether the semitransparent display mode or non-semitransparent display mode is set. There are also various kinds of modes which can be set by the operation unit 3104, and data representing the set mode is stored in the RAM 3102. Hence, in determining a mode, it is determined by referring to the data whether the mode is set.

If the non-semitransparent display mode is set, the processing advances to step S2022 to generate a polygon having a non-transparent color by controlling the α value of the polygon. Processing of mapping a texture which describes information about the part to the polygon is executed for each part (step S2022). That is, the list image is generated, as in the first embodiment. This processing also applies to a 2D list image. The list image is generated, as in the first embodiment.

If semitransparent display is to be executed, the processing advances to step S2012 to obtain the angle made by a line segment A from the position of the viewpoint of the observer 100 to the position of the virtual object (e.g., the barycenter of all parts included in the virtual object) and a line-of-sight vector B (vector with an infinite length from the position of the viewpoint to the direction defined by the orientation) (step S2012). When the obtained angle has a predetermined value or less (value close to 0 is preferable), it can be determined that the virtual object is present in the direction of line of sight of the observer 100. The processing advances to step S2021 to generate a polygon having a transparent color by controlling the α value of the polygon. Processing of mapping a texture which describes information about the part to the polygon is executed for each part, thereby generating the list image (step S2021). This texture is created in advance as transparent except the character portion (the α values of pixels included in portions except the character portion are set transparent). The transparency of the polygon is higher than the polygon in step S2022.

This processing also applies to a 2D list image. Pixels included in portions except the character portion are set transparent by controlling the α values of the pixels except the character portion.

When the virtual object is present in the direction of line of sight of the observer, i.e., when it is assumed that the observer is gazing at the virtual object, gaze of the virtual object can be hindered by display of the list image. To prevent this, in this embodiment, when it is determined that the virtual object is present in the direction of line of sight of the observer, the list image with higher transparency is displayed. In this case, information to be presented by the list image can be shown to the observer without hindering gaze of the virtual object.

If the angle obtained in step S2012 has a predetermined value or more, the processing advances to step S2022.

Processing in step S2012 or S2020 can employ any method if the purpose of checking whether a virtual object is present in the direction of line of sight can be achieved. More specifically, in this embodiment, the angle made by the line-ofsight vector B and the line segment A from the position of the viewpoint of the observer 100 to the position of the virtual object (e.g., the barycentric positions of all parts included in the virtual object) is obtained. When the angle has a predetermined value or less, it is determined that the virtual object is present in the direction of line of sight. Except this, when the virtual object is formed from a polygon, crossing between the line-of-sight vector and the polygon is determined. It can be determined that the virtual object is present in the direction of line of sight when an intersection is present. As described above, the method is not particularly limited.

The list image generated by the above processing is displayed on the display screen of the HMD 110 or a display device 3105.

Fourth Embodiment

In this embodiment, the operation for the assembly tree displayed in the list image and the display range in the above embodiments are controlled. The operation for the assembly tree is executed by using a stylus 120 an observer 100 wears in the hand. Hence, the list image must be displayed at a fixed position without following the position of the stylus 120.

Figure 21:
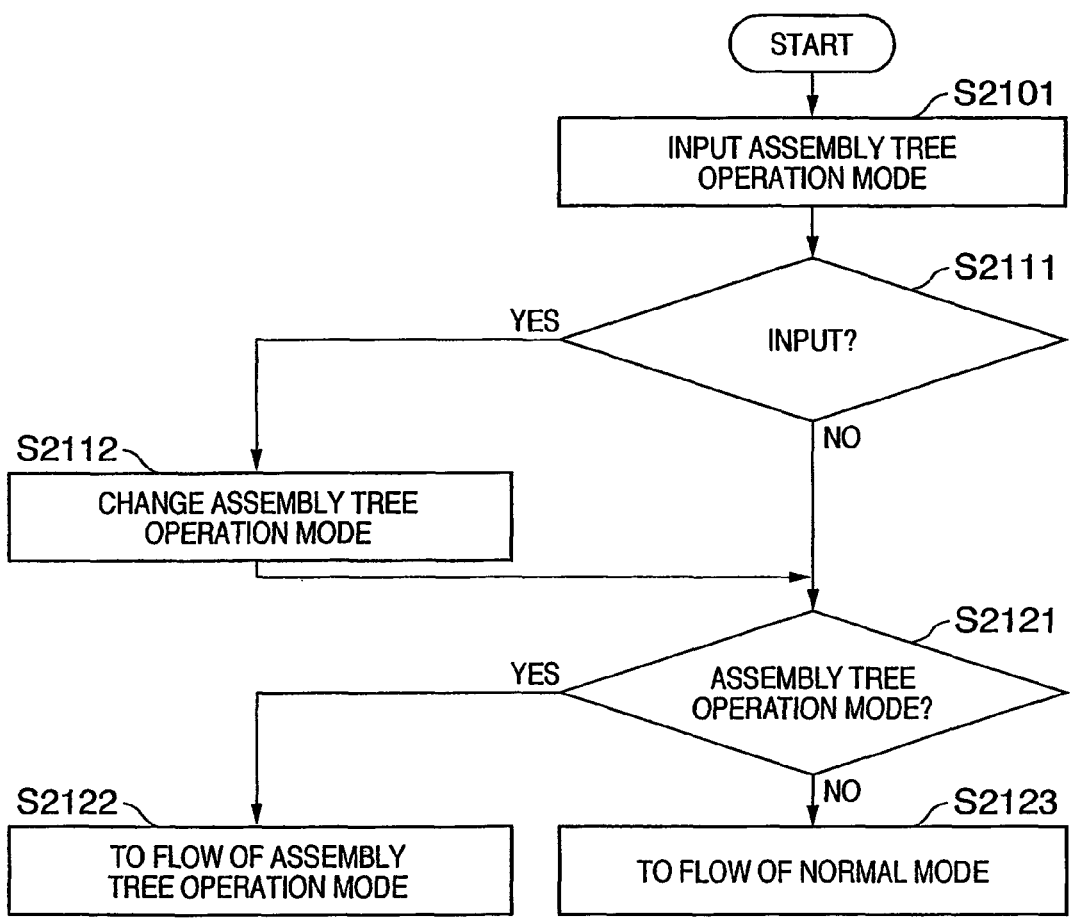
FIG. 21 is a flowchart of processing to be executed by the CPU 3101 when an operation is executed for the assembly tree displayed in the list image.

FIG. 21 is a flowchart of processing to be executed by a CPU 3101 when the operation is executed for the assembly tree displayed in the list image. Processing according to the flowchart shown in FIG. 21 is executed after all processing operations in step S404 are ended.

The operator of a computer 140 looks at a list image displayed on the display screen of a display device 3105. If the observer 100 is going to do some operation for displayed information about the respective parts, the operator executes a predetermined operation (e.g., pressing or clicking on a predetermined button) by using the mouse or keyboard included in an operation unit 3104 to change the mode to permit the operation.

When such operation input is done, the instruction by the operation is sent to a CPU 3101. The CPU 3101 always receives the instruction (step S2101). When the operation instruction is input, i.e., when the CPU 3101 detects the instruction (step S2111), the processing advances to step S2112 to set a mode to permit the operation (step S2112). Actually, data representing this mode is stored in a RAM 3102. Upon detecting the instruction, the CPU 3101 sets a value representing the "mode to permit the operation" to the data, thereby setting the mode to permit the operation.

The CPU 3101 checks by referring to the data representing the mode whether the mode (assembly tree operation mode) to permit the operation is set (step S2121). If YES in step S2121, the processing advances to step S2122 to execute processing to be described later. If a mode (normal mode) not to permit the operation is set, the processing advances to step S2123 to execute the same processing as in the first embodiment. That is, in the normal mode, the fourth embodiment is the same as the first embodiment.

With this arrangement, when no assembly tree is displayed on the screen, any erroneous unintended operation for the assembly tree can be prevented.

The processing in step S2122 will be described next in detail.

Figure 22:
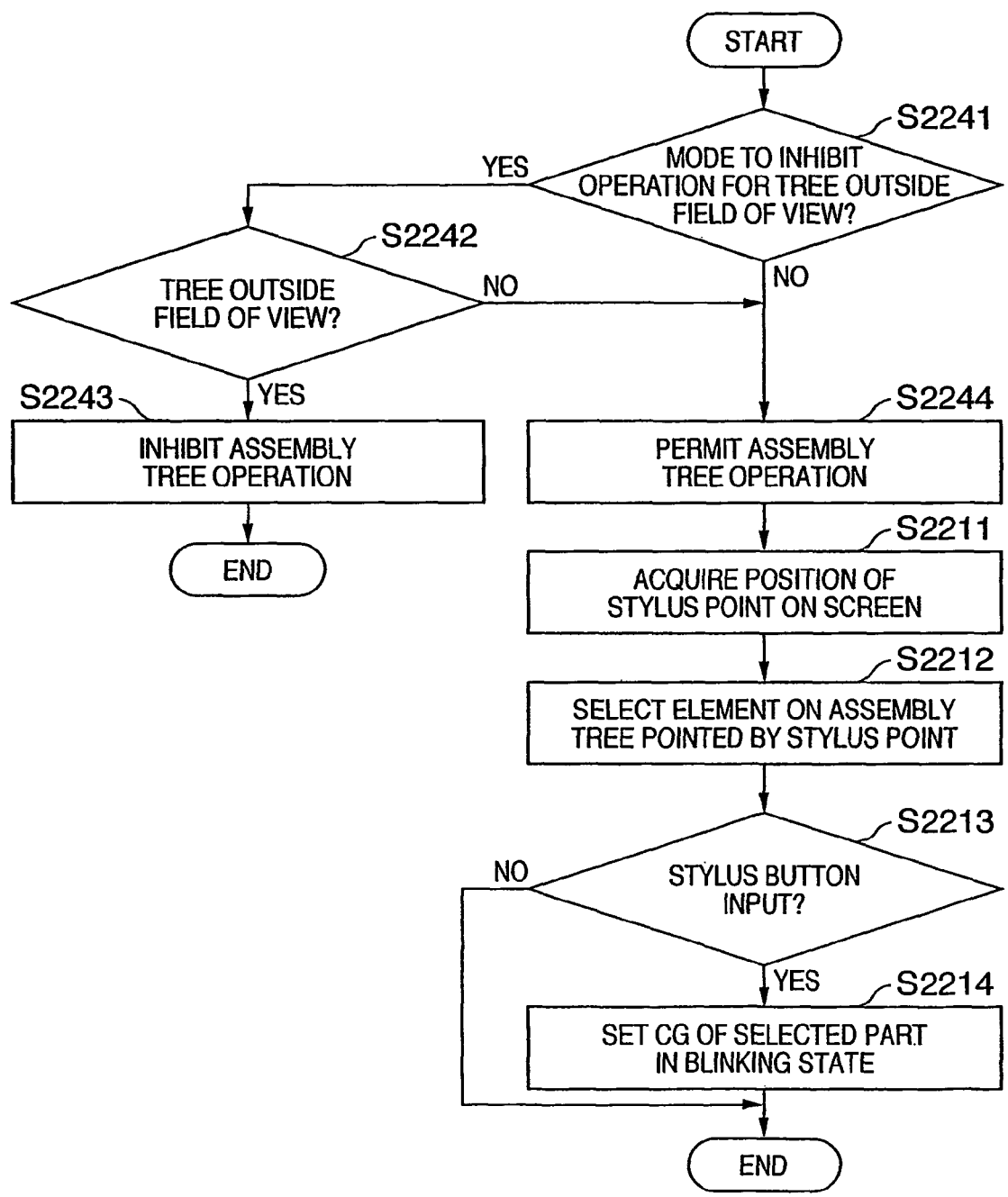
FIG. 22 is a flowchart showing details of processing in step S2122.

FIG. 22 is a flowchart showing details of the processing in step S2122.

Various operations can be executed for information about the respective parts indicated by the list image, i.e., the so-called assembly tree, as in a general CAD system. Some of the various operations will be described below. Other operations can also be executed for some information indicated by the list image.

It is determined whether a mode to inhibit operations for the assembly tree when the list image is placed outside the display screen of an HMD 110 is set (step S2241).

This mode can be set by the operation unit 3104. Data representing the set mode is stored in the RAM 3102. Hence, in step S2241, it is determined by referring to this data whether the inhibition mode is set.

If YES in step S2241, the processing advances to step S2242 to determine whether the list image is placed in the display screen of the HMD 110 (step S2242). This determination is done by checking, e.g., whether when the coordinate values of the four corners of the list image in the virtual space are projected in the display screen of the HMD 110, the values are placed in the display screen. For projection, a known projection conversion matrix to display an object in a virtual space onto a display screen is used.

If it is determined that the values are outside the display screen (the list image projects from the display screen of the HMD 110), the processing advances to step S2243 to inhibit operations for the assembly tree (step S2243). That is, any operation for each information indicated by the list image is inhibited. Hence, in this step, the CPU 3101 stops receiving any operation for the assembly tree from the stylus 120.

If NO in step S2241 or NO in step S2242, the processing advances to step S2244 to make the CPU 3101 receive operations for the assembly tree (step S2244).

Data representing the position and orientation of the stylus 120 in the sensor coordinate system is stored in the RAM 3102. The data is converted and projected onto the projection plane to obtain the position of the stylus 120 on the display screen of the HMD 110 (step S2211). In addition, the positions of the four corners of each polygon, which forms the list image, in the display screen of the HMD 110 are obtained in a similar manner by projection processing. In which polygon the position of the stylus 120 in the screen is located, i.e., information about which part is pointed by the stylus 120 is specified (step S2212).

The CPU 3101 checks whether a signal representing that a stylus button 122 is pressed is input through an I/F 3107 (step S2213). If YES in step S2213, the processing advances to step S2214 to blink the virtual object of the part corresponding to the information described in the polygon (planar virtual object) pointed by the position of the stylus 120 (step S2214). More specifically, which planar virtual object has information about which part is managed, as described above. In addition, information about each part is associated with data necessary for generating the image of the part. When the planar virtual object pointed by the position of the stylus 120 can be specified, the virtual object of the part corresponding to the information described in the specified planar virtual object is specified by referring to the association. Hence, the virtual object of the part can be displayed in the blinking state. The present invention is not limited to blink display. Any other display can be executed when the virtual object of the part pointed by the position of the stylus 120 can visually be recognized.

Figure 27:
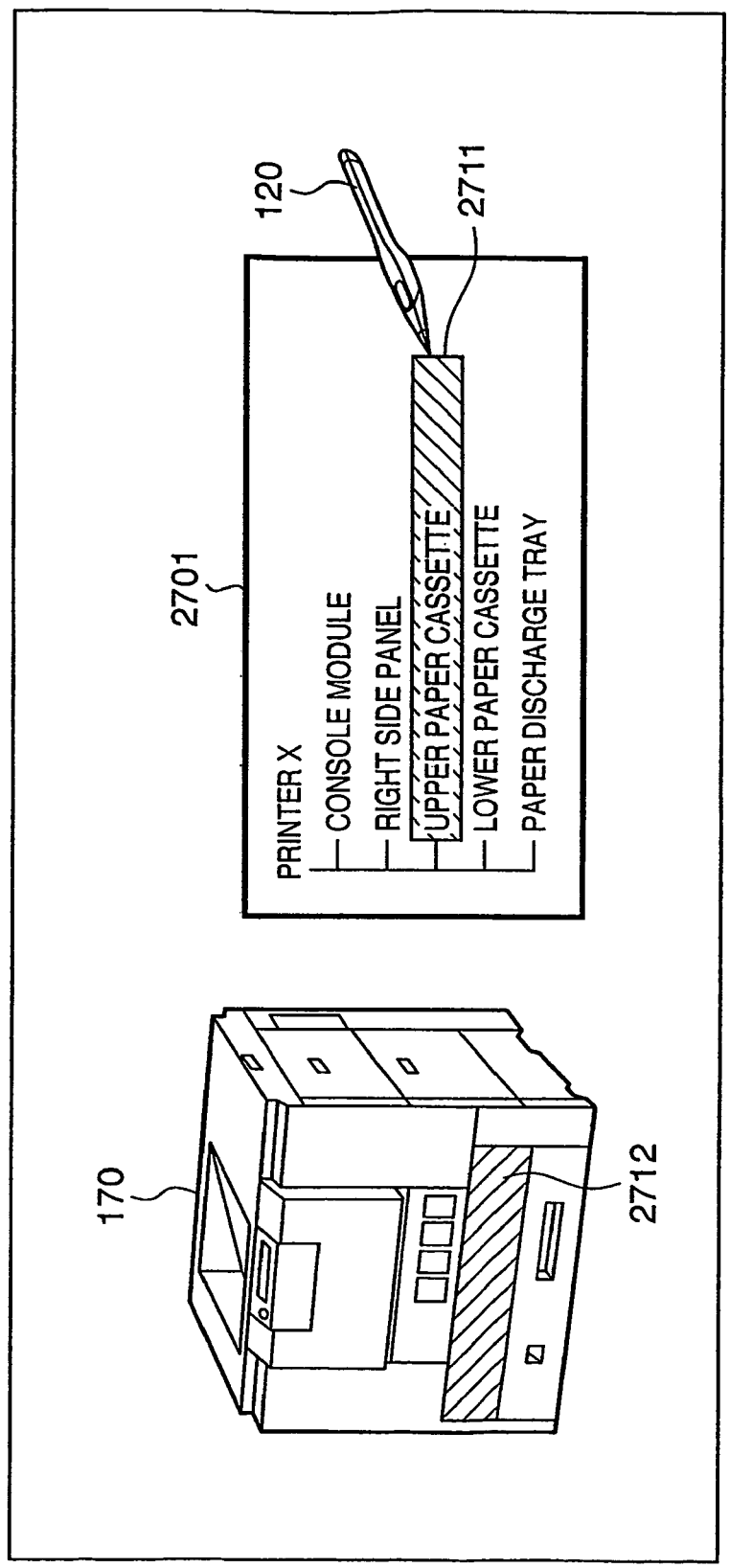
FIG. 27 is a view showing a display example in which when a planar virtual object 2711 with a description "upper paper cassette" is pointed by the position of the stylus 120 in a list image 2701, a corresponding part 2712 in the virtual object 170 of the copying machine blinks.

FIG. 27 is a view showing a display example in which when a planar virtual object 2711 with a description "upper paper cassette" is pointed by the position of the stylus 120 in a list image 2701, a corresponding part 2712 in a virtual object 170 of a copying machine blinks.

The names of parts included in an apparatus "printer X" are listed in the list image. The stylus 120 is located in the display region of the planar virtual object 2711. In addition, the stylus button 122 is pressed. Hence, the virtual object of the corresponding part 2712 ("upper paper cassette") blinks.

Processing of determining on the basis of the distance between the position of the stylus 120 and the virtual object 170 up to which layer level in the parent/child structure of the parts included in the virtual object 170 is to be presented by the list image will be described next.

Figure 24:
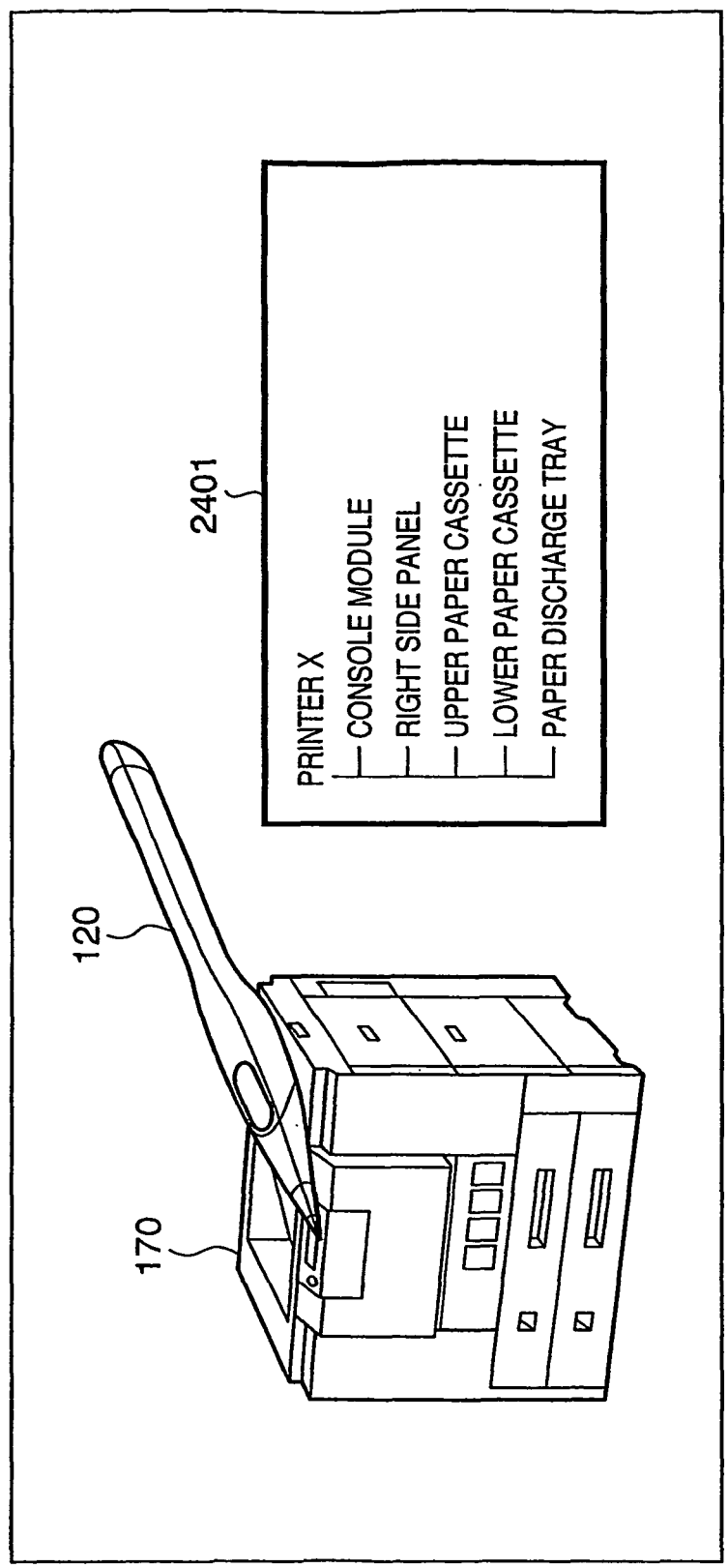
FIG. 24 is a view showing a display example of the list image which is displayed when the stylus 120 is moved close to the virtual object 170 of the copying machine.

FIG. 24 is a view showing a display example of the list image which is displayed when the stylus 120 is moved close to the virtual object 170 of the copying machine. In this case, of the parent/child structure of the parts included in the virtual object 170 (printer X), only the names of the parts of the uppermost layer are displayed in a list image 2401. Referring to FIG. 24, "console module", "right side panel", "upper paper cassette", "lower paper cassette", and "paper discharge tray" are displayed.

Figure 25:
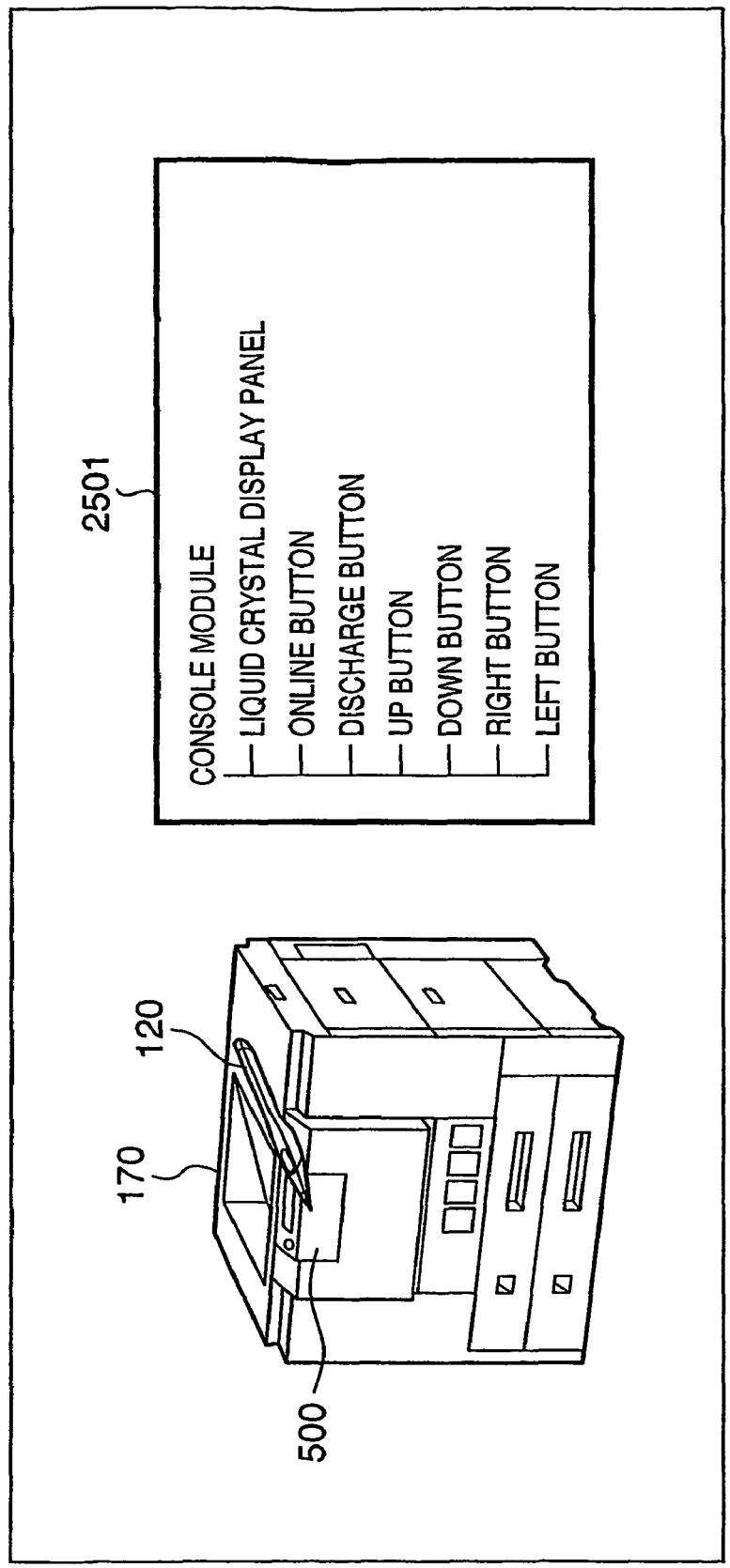
FIG. 25 is a view showing a display example of the list image when the stylus 120 is further moved close to the console module 500.

FIG. 25 is a view showing a display example of the list image when the stylus 120 is further moved close to a console module 500. Only the names of parts (parts belong to the layer immediately under the layer to which the console module 500 belongs) corresponding to the children of the console module 500 are displayed in a list image 2501. Referring to FIG. 25, "liquid crystal display panel", "online button", "up button", "down button", "right button", and "left button" are displayed. FIG. 25 shows only the names of the parts included in the console module 500. The names of the parts included in the console module 500 may be displayed while keeping the layer shown in FIG. 24 displayed.

Figure 23:
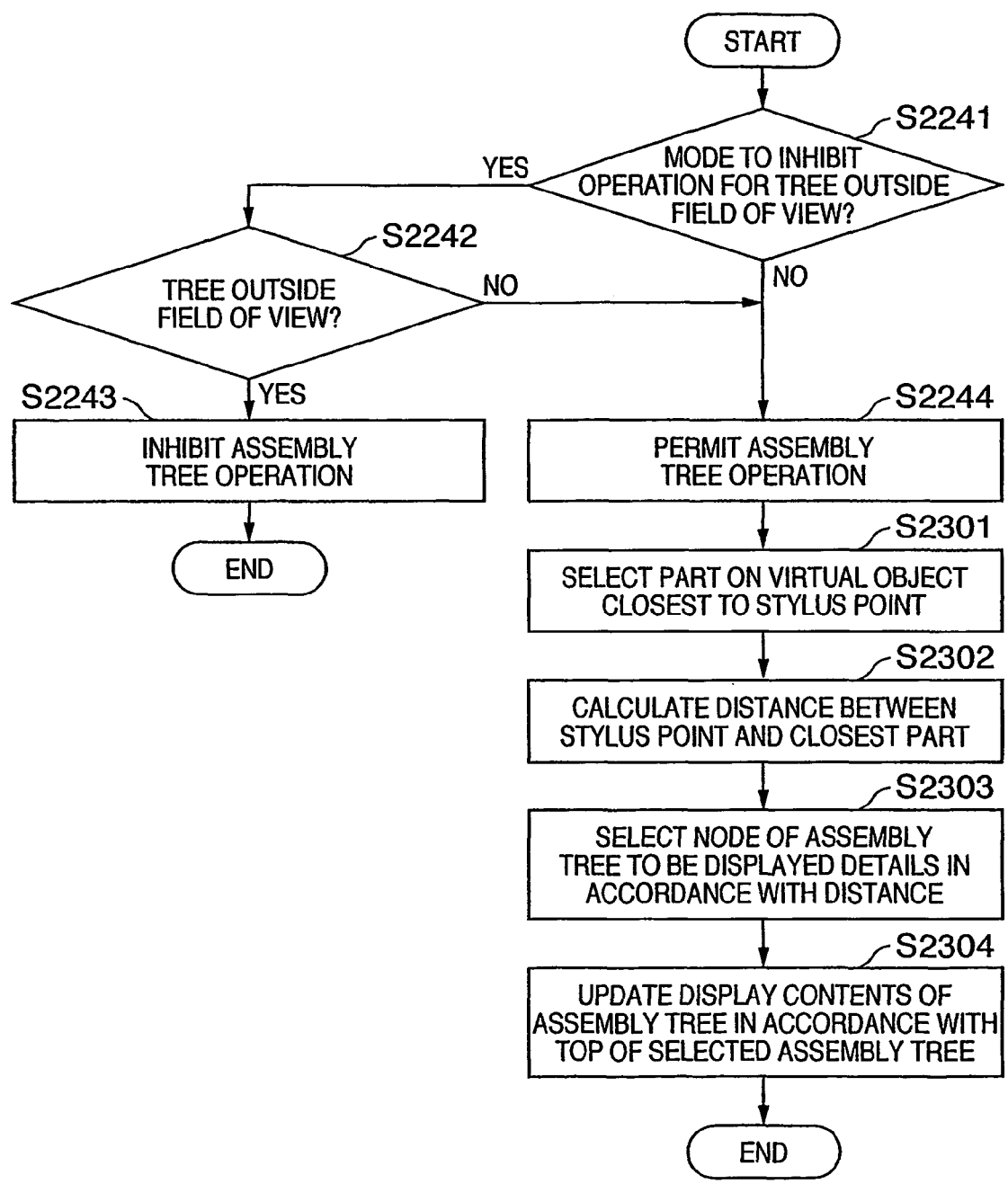
FIG. 23 is a flowchart of processing of determining on the basis of the distance between the position of the stylus 120 and the virtual object up to which layer level in the parent/child structure of the parts included in the virtual object is to be presented by the list image.

FIG. 23 is a flowchart of processing of determining on the basis of the distance between the position of the stylus 120 and the virtual object up to which layer level in the parent/child structure of the parts included in the virtual object is to be presented by the list image. Processing according to the flowchart shown in FIG. 23 is executed in generating the list image.

It is determined whether a mode to inhibit operations for the assembly tree when the list image is placed outside the display screen of the HMD 110 is set (step S2241).

This mode can be set by the operation unit 3104. Data representing the set mode is stored in the RAM 3102. Hence, in step S2241, it is determined by referring to this data whether the inhibition mode is set.

If YES in step S2241, the processing advances to step S2242 to determine whether the list image is placed in the display screen of the HMD 110 (step S2242). This determination is done by checking, e.g., whether when the coordinate values of the four corners of the list image in the virtual space are projected in the display screen of the HMD 110, the values are placed in the display screen. For projection, a known projection conversion matrix to display an object in a virtual space onto a display screen is used.

If it is determined that the values are outside the display screen (the list image projects from the display screen of the HMD 110), the processing advances to step S2243 to inhibit operations for the assembly tree (step S2243). That is, any operation for each information indicated by the list image is inhibited. Hence, in this step, the CPU 3101 stops receiving any operation for the assembly tree from the stylus 120.

If NO in step S2241 or NO in step S2242, the processing advances to step S2244 to make the CPU 3101 receive operations for the assembly tree (step S2244).

Next, the part closest to the position (position of a position/orientation sensor receiver 121 in the sensor coordinate system) of the stylus 120 is specified (step S2301). For example, of parts in the uppermost layer of the parent/child structure of the parts included in the virtual object, i.e., of the most roughly divided parts (in the virtual object 170, the parts displayed in the list image shown in FIG. 24), the part closest to the position of the stylus 120 is specified. Each of the "most roughly divided parts" (parent parts) has at least part (child part) corresponding to the child. As the position of the parent part, the barycenter of the positions of the child parts included in the parent part is used. Processing of obtaining the distance between the barycenter and the position of the stylus 120 is executed for all parent parts, thereby specifying the parent part closest to the position of the stylus 120.

The distance between the specified part and the stylus 120 is referred to (step S2302). Up to which layer is to be displayed is determined in accordance with the referred distance (step S2303).

Figure 13:
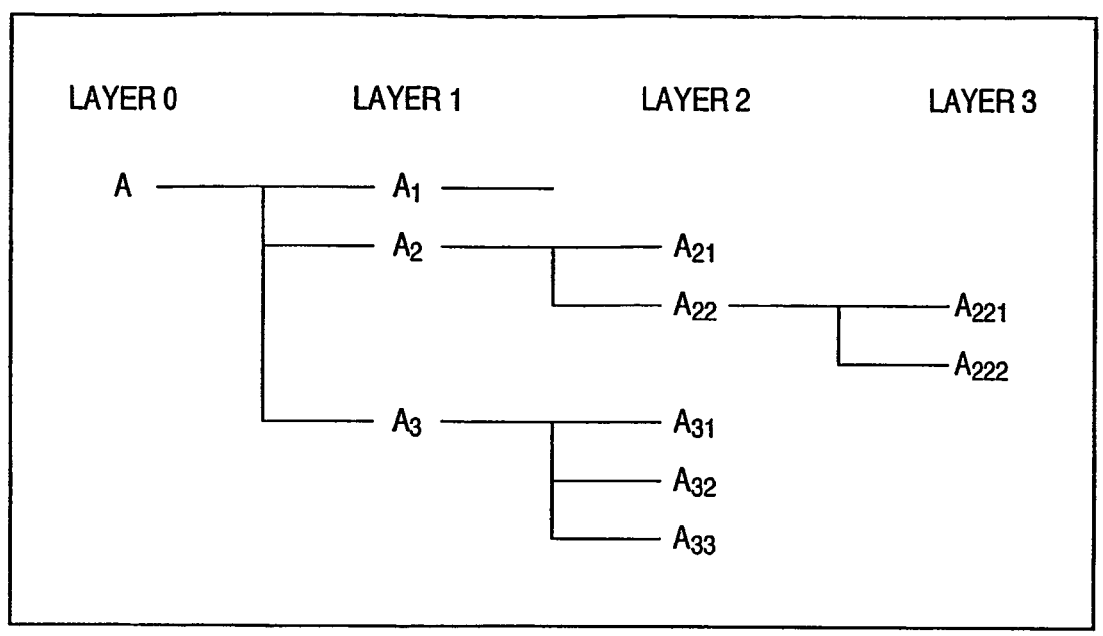
FIG. 13 is a view showing the assembly tree of parts included in a virtual object A.

FIG. 13 is a view showing the assembly tree of parts included in a virtual object A. Such an assembly tree is stored in an external storage device 3106 as data to display the virtual object A. The virtual object A is roughly divided into a part A1, part A2, and part A3. The layer to which the part A1, part A2, and part A3 belong is called layer 1.

The part A2 includes a part A21 and part A22. The part A3 includes a part A31, part A32, and part A33. The layer to which the part A21, part A22, part A31, part A32, and part A33 belong is called layer 2.

The part A22 includes a part A221 and part A222. The layer to which the part A221 and part A222 belong is called layer 3.

As described above, generally, a virtual object is managed by a hierarchical structure based on the parent/child relationship between parts. The location of a part in the hierarchical structure can be expressed by the layer to which the part belongs.

In step S2303, it is determined in accordance with the distance between the stylus 120 and the part specified in step S2301 whether to display information about the parts belonging to layers 0 and 1, information about the parts belonging to layers 0 to 2, or information about the parts belonging to layers 0 to 3. For example, when the distance is 50 cm or more, pieces of information about the parts belonging to only layers 0 and 1 are displayed. When the distance is 25 to 50 cm, pieces of information about the parts belonging to layers 0 to 2 are displayed. When the distance is 25 cm or less, pieces of information about the parts belonging to layers 0 to 3 are displayed. In this way, as the distance shortens, pieces of information about the parts belonging to lower layers are displayed.

Hence, in the assembly tree, determining layers of parts whose information should be displayed is equivalent to selecting the node between the layers.

The layers to be displayed are determined in step S2303. Next, a list image is generated by using information about the parts belonging to the layers to be displayed, as described above (step S2304).

Figure 26:
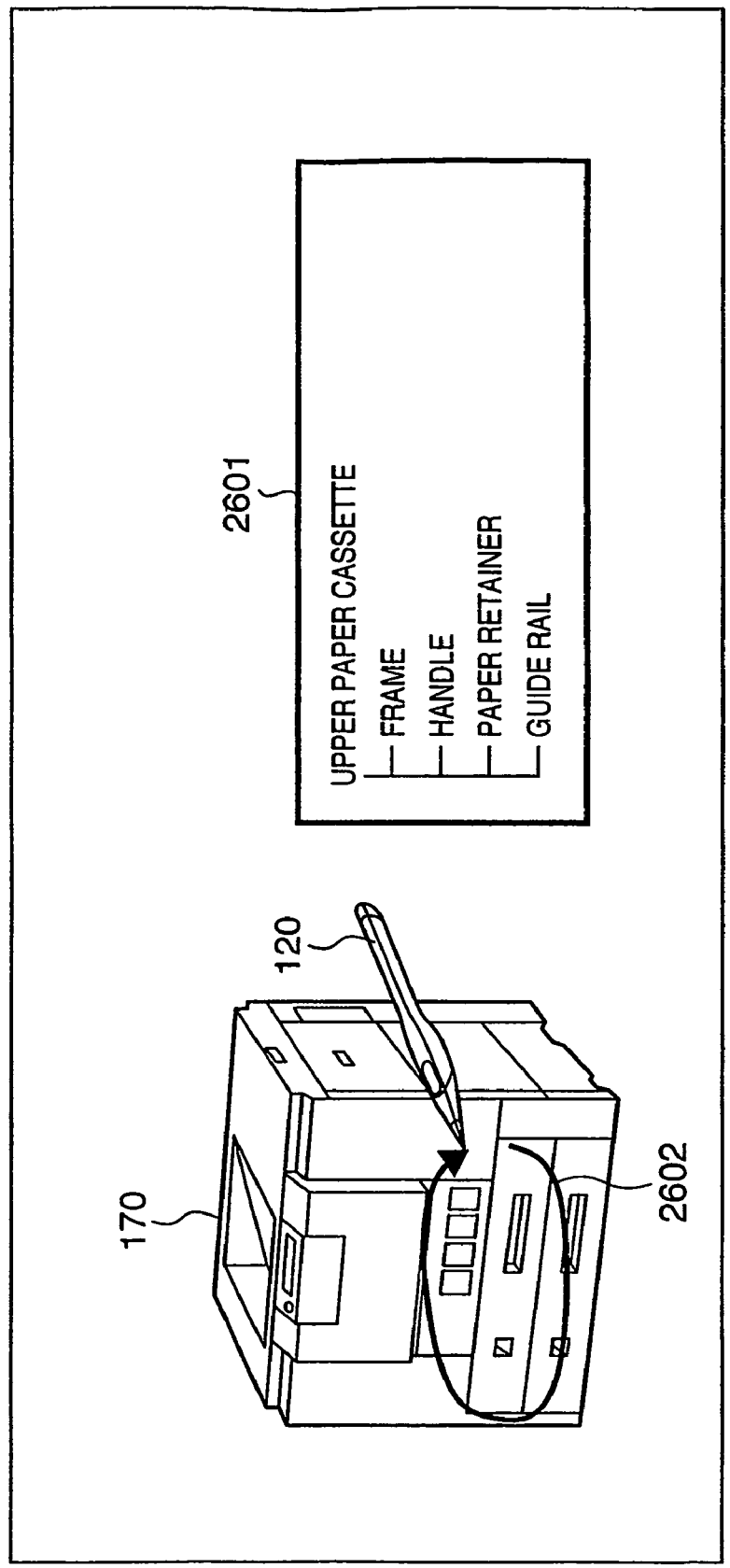
FIG. 26 is a view showing a display example of the list image of a portion pointed by gesture.

FIG. 26 is a view showing a display example of the list image of a portion pointed by gesture. When the stylus 120 is moved to enclose the virtual part corresponding to the node to be selected, the node to display details is selected. In this example, the upper paper cassette is selected. As a result, an assembly tree 2601 is displayed.

Figure 28:
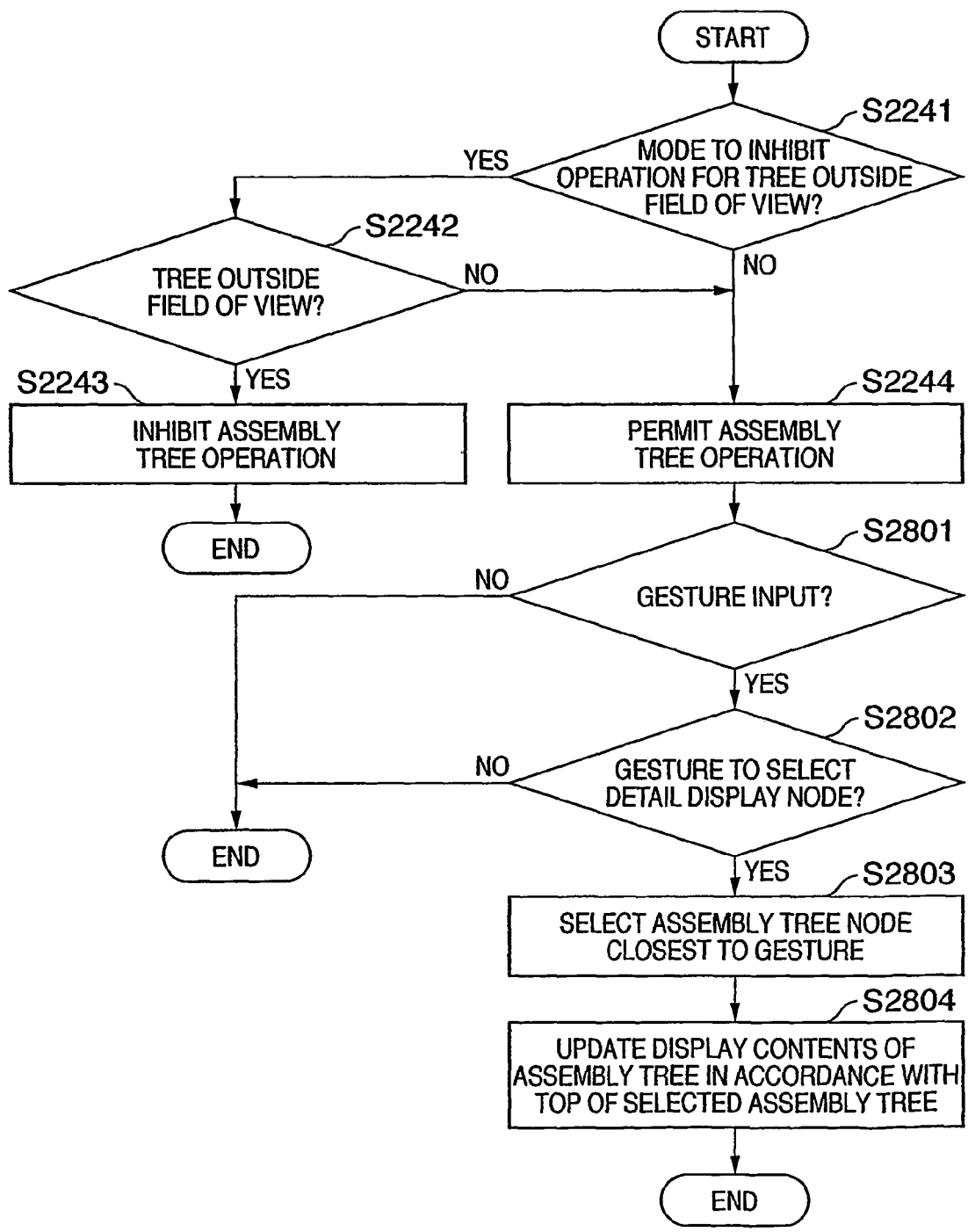
FIG. 28 is a flowchart of processing of displaying the list image of a portion pointed by gesture.

The flow of this processing will be described with reference to the flowchart shown in FIG. 28. FIG. 28 is a flowchart of processing of displaying the list image of a portion pointed by gesture. Actually, this processing is executed in step S404.

It is determined whether a mode to inhibit operations for the assembly tree when the list image is placed outside the display screen of the HMD 110 is set (step S2241).

This mode can be set by the operation unit 3104. Data representing the set mode is stored in the RAM 3102. Hence, in step S2241, it is determined by referring to this data whether the inhibition mode is set.

If YES in step S2241, the processing advances to step S2242 to determine whether the list image is placed in the display screen of the HMD 110 (step S2242). This determination is done by checking, e.g., whether when the coordinate values of the four corners of the list image in the virtual space are projected in the display screen of the HMD 110, the values are placed in the display screen. For projection, a known projection conversion matrix to display an object in a virtual space onto a display screen is used.

If it is determined that the values are outside the display screen (the list image projects from the display screen of the HMD 110), the processing advances to step S2243 to inhibit operations for the assembly tree (step S2243). That is, any operation for each information indicated by the list image is inhibited. Hence, in this step, the CPU 3101 stops receiving any operation for the assembly tree from the stylus 120.

If NO in step S2241 or NO in step S2242, the processing advances to step S2244 to make the CPU 3101 receive operations for the assembly tree (step S2244).

Next, the presence/absence of gesture input is determined (step S2801). If no gesture input is done, selection of a node to display details is ended. Recognition of presence/absence of gesture input is a known technique. In this embodiment, for example, the motion of the stylus 120 is always monitored, and pattern matching between the trajectory and a circle, triangle, or rectangle is executed. When the patterns match, the presence of gesture is recognized. Alternatively, when the stylus moves reciprocally to the left and right or up and down, the presence/absence of gesture input can be detected by recognizing the motion of a predetermined distance or more in reverse directions a predetermined number of times or more in a predetermined time.

If YES in step S2801, it is determined whether the gesture selects a detail display node (step S2802). In this embodiment, a detail display node is selected by drawing a circle (step S2803).

If YES in step S2802, the node closest to the stylus 120 is selected (step S2803). As described above, the layer of the node can also be selected on the basis of the distance between the part and the position of the stylus 120.

The display contents of the assembly tree are updated to display details of the selected node (step S2804).

With the above processing, the node to display details can easily be selected by gesture.

Figure 29:
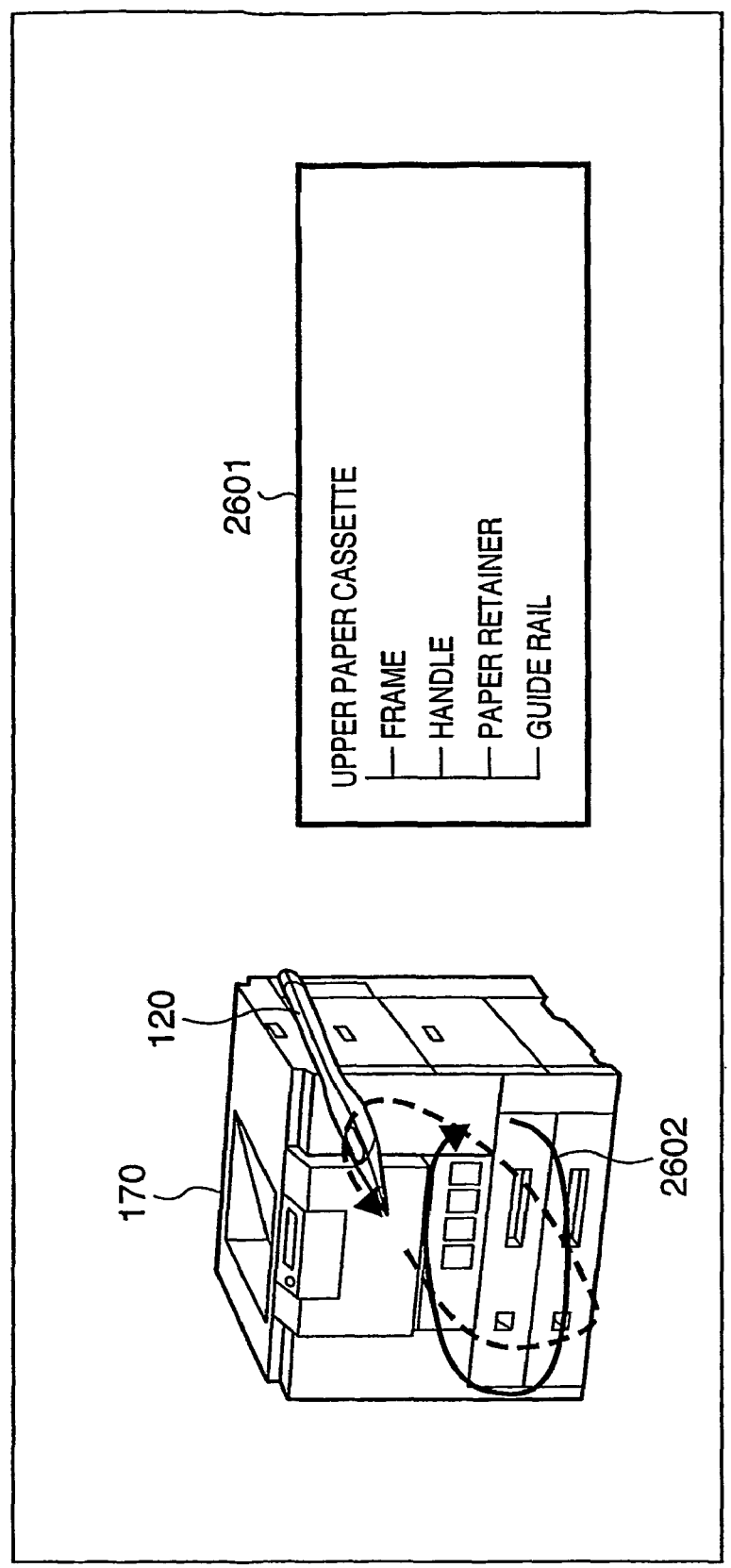
FIG. 29 is a view for explaining an operation of designating a position in the depth direction as indicated by a dotted line to more specifically designate a target node.

When the position is also designated in the depth direction as indicated by the dotted line in FIG. 29, in addition to the gesture described with reference to FIG. 26, the target node can be designated in more detail.

When semitransparent CAD data is displayed in designating the node by gesture, the node of a part which does not appear on the outer appearance can be designated.

In the semitransparent processing, the semitransparent region can be expanded with time outward from the portion near the stylus. With this processing, the easily recognizable opaque state of the CAD data can be held as much as possible. To designate a wider range by the stylus, it is located at one point for a long time so that the position and orientation can be designated by the stylus.

When a predetermined distance range from the stylus is set semitransparent, position designation by the stylus can be facilitated. When the distance to set transparent is adjusted in accordance with the size of the target CAD data, a more convenient system can be built.

Fifth Embodiment

In this embodiment, list image display is adjusted in addition to the above-described embodiments.

In the mixed reality system, generally, it is difficult to acquire accurate depth information of a moving real object such as a human hand. Hence, composition is basically done by only overwriting a virtual space image on a real image (physical space image).

For this reason, even when a physical object is located in front of a virtual object, the physical object is often occluded by the image of the virtual object. However, the hand of the observer is very significant in practical use. Hence, processing of, e.g., recognizing the flesh color and inhibiting superimposition of the virtual space image on the real image of only the hand portion is executed.

Figure 15:
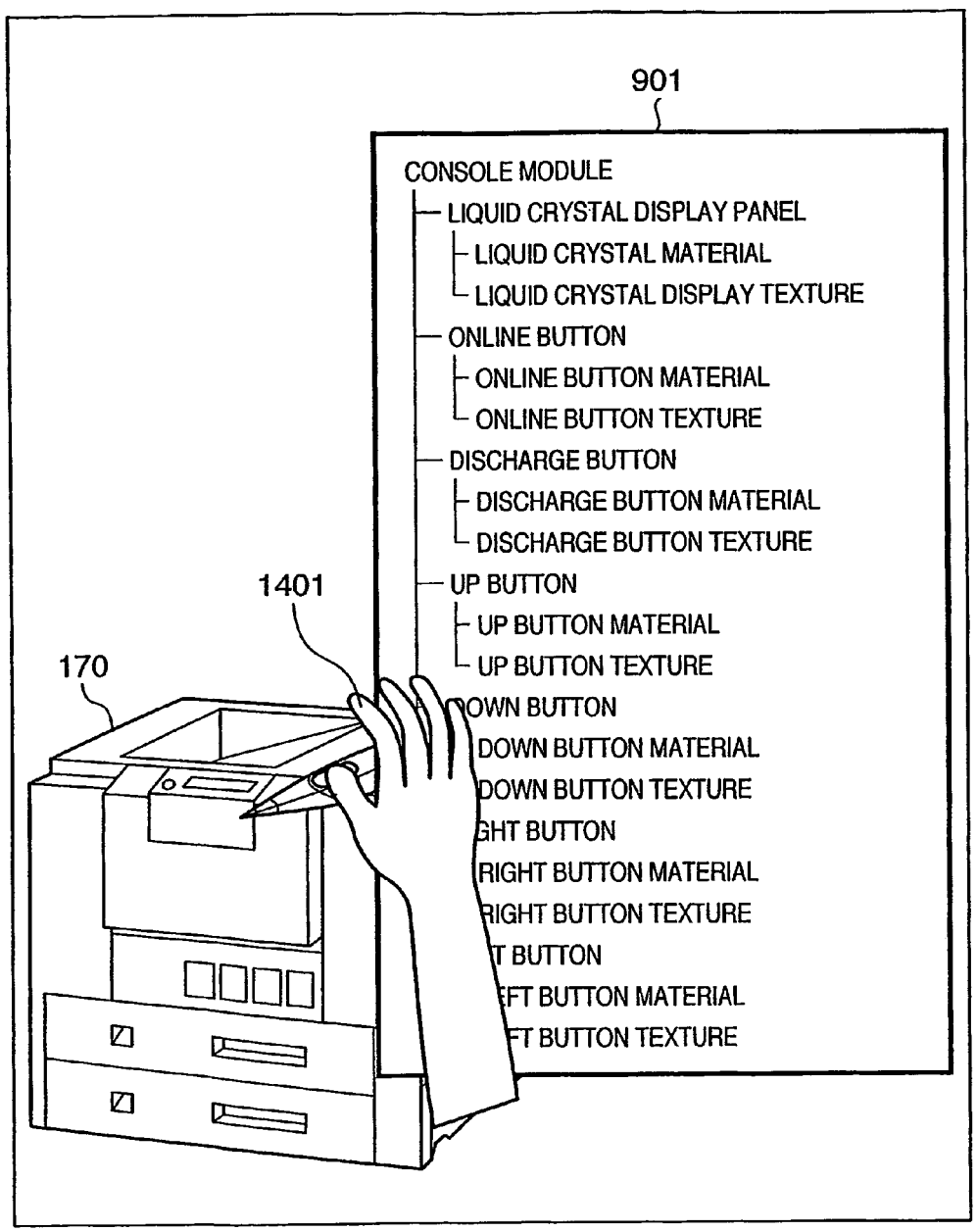
FIG. 15 is a view showing a display example of the mixed reality space image obtained by adjusting display of the list image.

When this processing is added to the processing of the first embodiment, a mixed reality space image as shown in FIG. 15 can be obtained.

Figure 16:
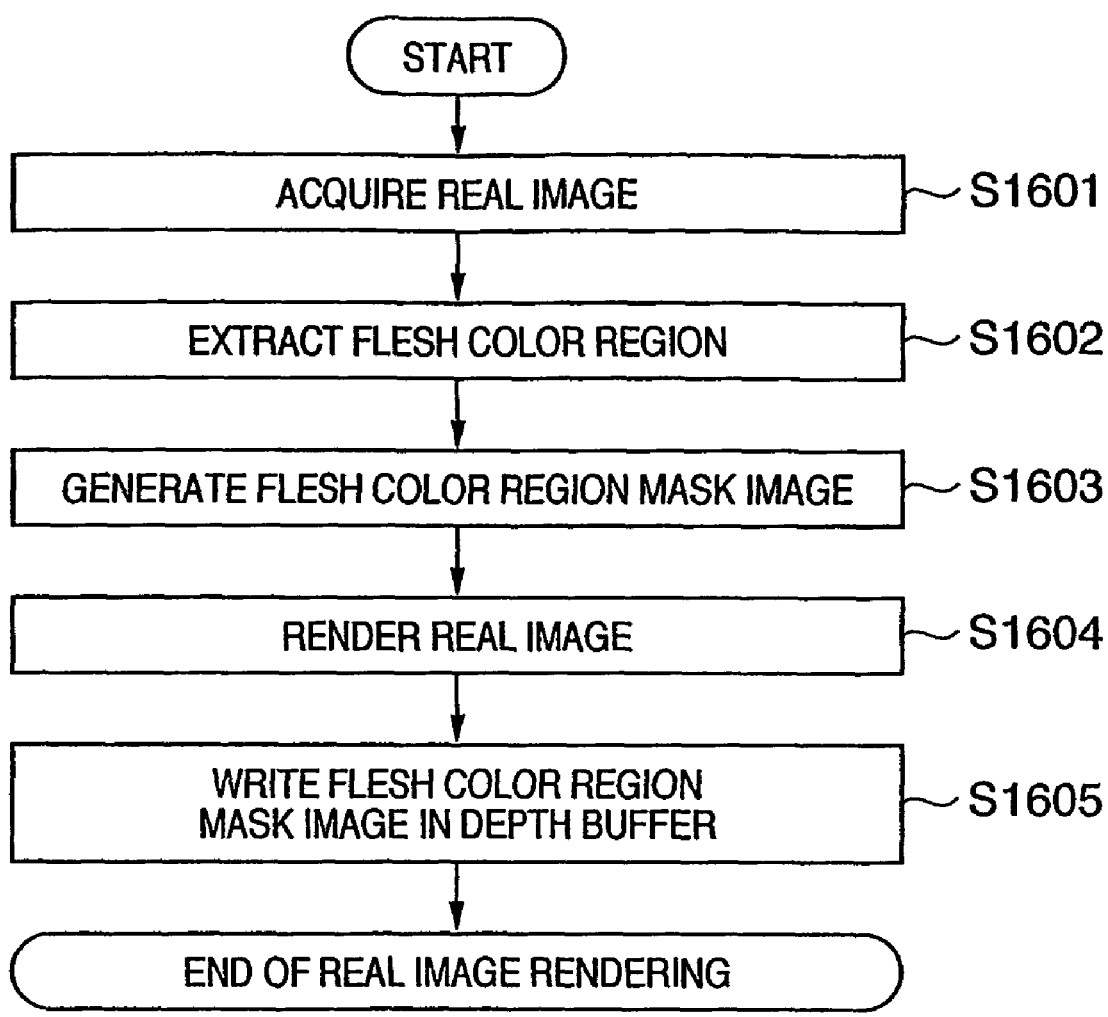
FIG. 16 is a flowchart of processing of masking the hand region in a physical space image (real image)

FIG. 16 is a flowchart of processing of masking the hand region in the physical space image (real image). Processing according to the flowchart shown in FIG. 16 is executed after the physical space image is acquired by a RAM 3102 in step S405.

As described above, the image capture thread acquires a physical space image obtained from a video camera 111 of an HMD 110 in step S420. The image is stored in a predetermined area of the RAM 3102 (step S1601). Color data registered in advance in an external storage device 3106 as "hand color" is loaded on the RAM 3102 (loading may be executed in advance). Pixels having the "hand color" are specified in the physical space image acquired in step S1601 by using the data, and the region (to be referred to as a "hand region" hereinafter) formed by the specified pixels is specified (step S1602).

When data representing the "hand color" indicates a "pixel value representing hand color", pixels having the pixel value are specified in step S1602. However, the "hand color" can change depending on the condition of light of outside world and the angle between the hand and light. Hence, data representing the "hand color" may indicate a "range of pixel values representing hand color". In this case, pixels having pixel values in this range are specified in step S1602.

An image (mask image) representing the hand region in the physical-space image is generated (step S1603). The physical space image acquired in step S1601 is rendered in a predetermined area of the RAM 3102 (step S1604). The mask image is written in the Z buffer (depth buffer) of the RAM 3102 (step S1605).

As is known, in processing in step S1605, Z value (when the Z-axis is provided in the direction of line of sight from the position of the viewpoint, the Z value increases in the direction of line of sight) for each pixel of the hand region is written in the Z buffer. The Z value is set, e.g., near the position of the viewpoint. To superimpose the virtual space on the physical space later, the Z buffer is referred to. Since only a portion with Z values larger than the Z value registered in the Z buffer is rendered, the virtual space is not superimposed on the hand region, as shown in FIG. 15.

Various methods can be used to inhibit rendering of the virtual space image on the hand region, and the present invention is not limited to the above-described method. When a known 3D graphics accelerator is mounted in the computer 140, the 3D graphics accelerator masks the specific region by using the Z buffer.

However, display of the assembly tree in the list image is often more important than display of the hand. In this case, the assembly tree must be displayed with priority over the hand. A method of implementing this will be described below.

Figure 18:
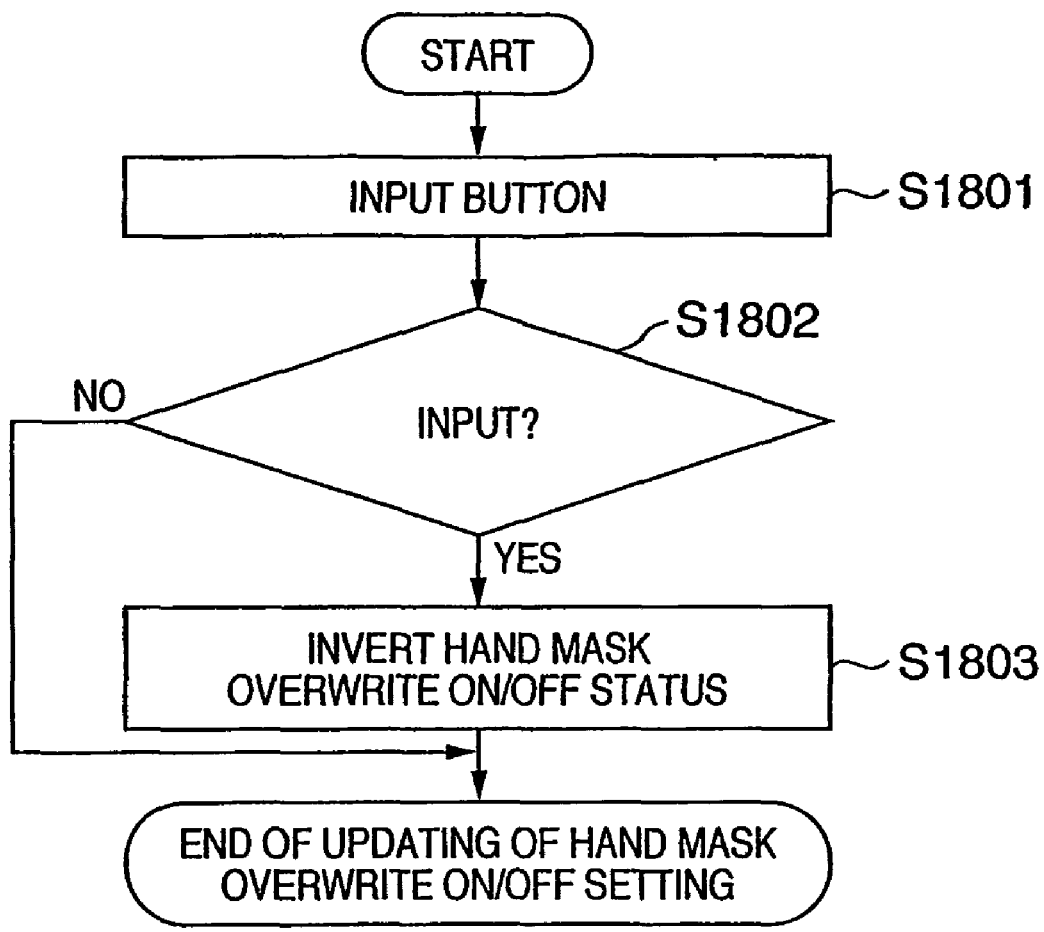
FIG. 18 is a flowchart of processing of switching between the list image and the hand region to preferentially display one of them.

FIG. 18 is a flowchart of processing of switching between the list image and the hand to preferentially display one of them. Processing according to the flowchart shown in FIG. 18, i.e., reception of operation for switching can be executed before step S401. Alternatively, the operation may always be received during processing.

A CPU 3101 monitors whether input is done to instruct display of the list image with priority over the hand region (display the list image in front of the hand region) (step S1801). This input can be done by using an operation unit 3104. Alternatively, the instruction may be input by pressing a stylus button 122 provided on a stylus 120.

When the CPU 3101 detects the input (step S1802), the processing advances to step S1803. When the flag (status) indicating that the hand region should be displayed with priority over the list image is currently ON, the flag is turned off. When the flag is currently OFF, the flag is turned on (step S1803). The data of the flag is stored in the RAM 3102. In this step, the current status is obtained by referring to this data, and the flag is ON/OFF-controlled.

Figure 17:
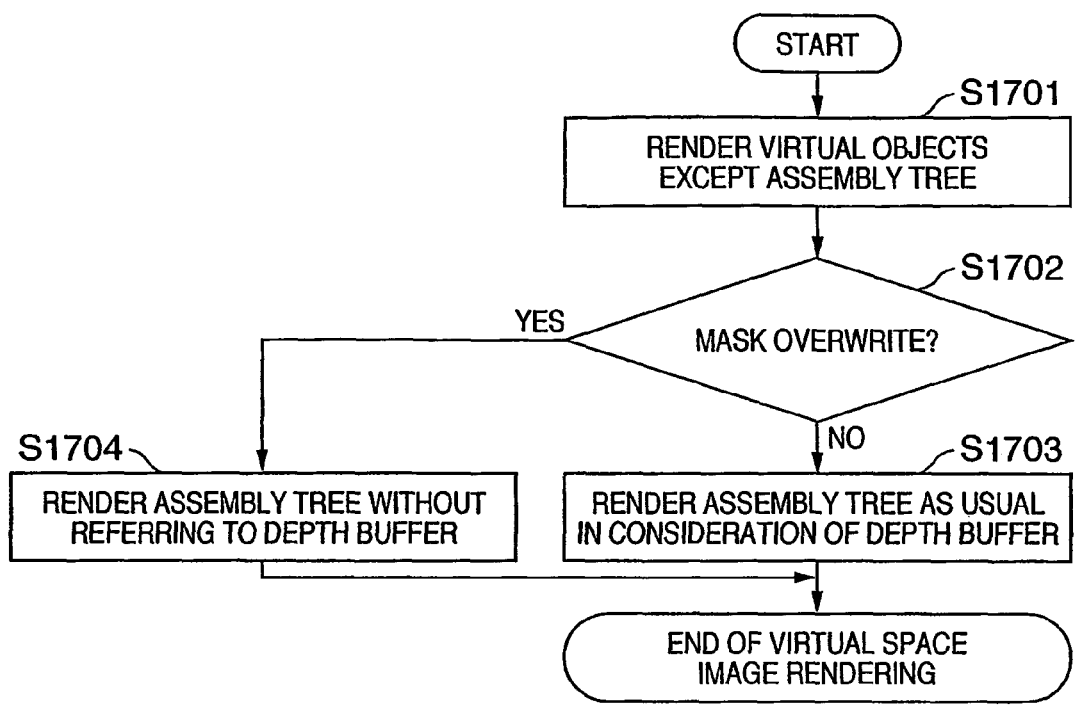
FIG. 17 is a flowchart of processing of switching between the list image and the hand region to preferentially display one of them by referring to a flag.

FIG. 17 is a flowchart of processing of switching between the list image and the hand region to preferentially display one of them by referring to the flag. Processing according to the flowchart shown in FIG. 17 is executed in step S406.

As in the first embodiment, an image is rendered on the physical space image stored in a predetermined area of the RAM 3102 in advance in step S405. At this time, a virtual object image except the list image is rendered (step S1701).

Figure 14:
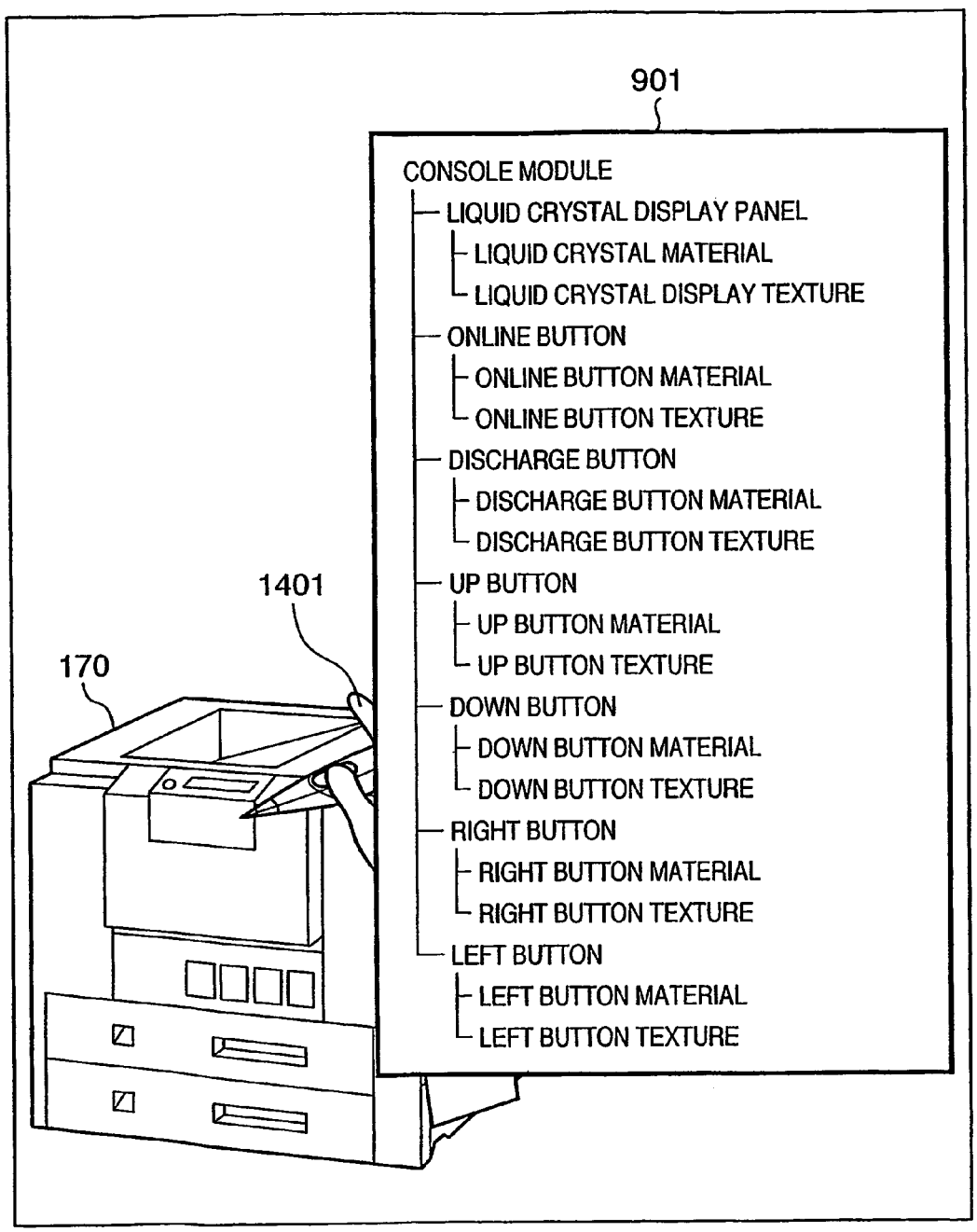
FIG. 14 is a view showing a list image preferentially rendered for a hand region.

It is determined by referring to flag switched in step S1803 whether to display (render) the list image with priority over the hand region (step S1702). If YES in step S1702, the processing advances to step S1704 to render the list image on the image rendered in step S1701 without referring to the Z buffer. As a result, the list image is rendered with priority over the hand region, as shown in FIG. 14.

If NO in step S1702, the processing advances to step S1703 to render the list image on the image rendered in step S1701 while referring to the Z buffer. The Z value "closest to the position of the viewpoint" for each pixel of the hand region is recorded in the Z buffer, as described above. The Z value is referred to, and a pixel having a Z value representing a larger depth than the Z value is not rendered. As a result, the hand region is rendered with priority over the list image.

The priority of display can be switched between the hand region and the list image, as described above. However, the mechanism is not always sufficient because one of them is always preferentially rendered.

Processing will be described below, in which a mode to display the hand region with priority over the list image as needed, a mode to display the list image at an offset position shifted from the position of the stylus or hand region, and a mode to set the transparency of the list image so high as to see the hand through it while simultaneously displaying the list image and hand region are provided, and operations can be executed while confirming the hand or stylus.

Figure 30:
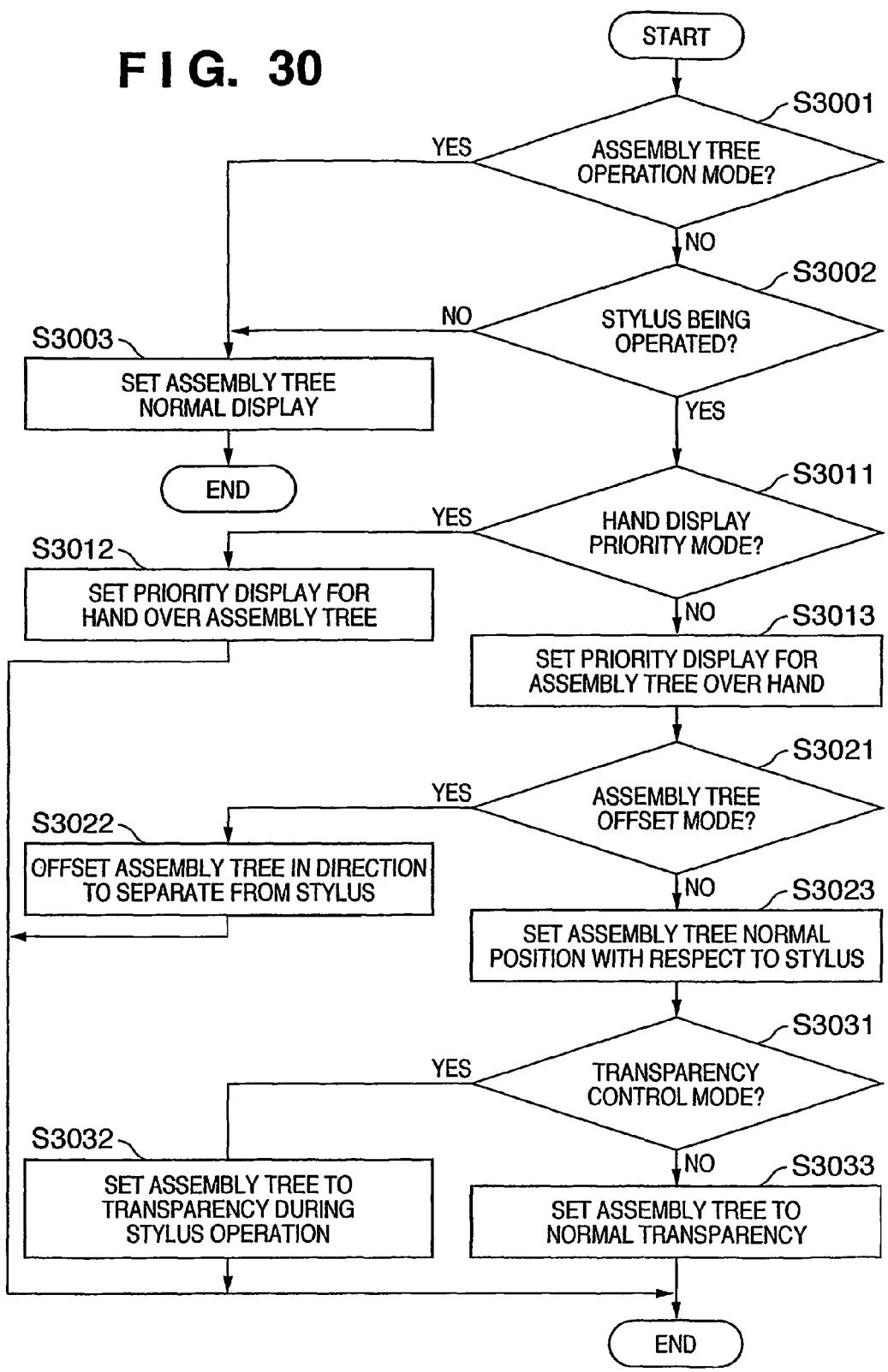
FIG. 30 is a flowchart of processing related to display of the hand region and list image.

FIG. 30 is a flowchart of processing related to display of the hand region and list image. Processing according to the flowchart shown in FIG. 30 is executed immediately before list image display in step S405.

The operator of a computer 140 looks at a list image displayed on the display screen of a display device 3105. If the observer 100 is going to do some operation for displayed information about the respective parts, the operator executes a predetermined operation (e.g., pressing or clicking on a predetermined button) by using the mouse or keyboard included in the operation unit 3104 to change the mode to permit the operation.

When such operation input is done, the instruction by the operation is sent to the CPU 3101. The CPU 3101 always receives the instruction. When the operation instruction is input, i.e., when the CPU 3101 detects the instruction (step S3001), the processing advances to step S3003 to do setting to execute processing (processing according to the flowchart shown in FIG. 22) in step S2122, as in the fourth embodiment. Display need not always be the same as in the fourth embodiment. The list image may simply be displayed at an arbitrary position.

If NO in step S3001, the processing advances to step S3002 to determine whether the stylus 120 is being operated (step S3002). For example, when the position and orientation of the stylus 120 do not change by a predetermined amount or more within a predetermined time (e.g., 3 sec) and/or the stylus button 122 is not pressed within a predetermined time, it is determined that the stylus 120 is "not being operated".

If NO in step S3002, the processing advances to step S3003 to execute the above-described processing.

If YES in step S3002, the processing advances to step S3011 to determine by referring to the flag whether to display (render) the list image with priority over the hand region (step S3011).

If YES in step S3011, the processing advances to step S3012 to do setting to render the list image on the already rendered image while referring to the Z buffer (step S3012).

If NO in step S3011, the processing advances to step S3013 to do setting to render the list image on the already rendered image without referring to the Z buffer (step S3013).

It is determined whether the mode to lay out the list image at a position (offset position) shifted from the position of the stylus 120 on the image is set (step S3021). The setting of this mode can be changed, like other modes. Data representing the set mode is stored in the RAM 3102.

If YES in step S3021, the processing advances to step S3022 to do setting to lay out the list image in the virtual space at a position shifted from the position of the stylus 120 by a predetermined distance (step S3022).

If NO in step S3021, the processing advances to step S3023 to do setting to lay out the list image as in the first embodiment (step S3023).

It is determined whether the mode to display a semitransparent list image is set (step S3031). This mode can be set by the operation unit 3104. Data representing the set mode is stored in the RAM 3102. Hence, in step S3031, it is determined by referring to the data whether the semitransparent display mode is set.

If NO in step S3031, the processing advances to step S3033 to generate a polygon having a non-transparent color by controlling the α value of the polygon. Processing of mapping a texture which describes information about the part to the polygon is executed for each part (step S3033). That is, the list image is generated, as in the first embodiment. This processing also applies to a 2D list image. The list image is generated, as in the first embodiment.

If YES in step S3031, the processing advances to step S3032 to generate a polygon having a transparent color by controlling the α value of the polygon. Processing of mapping a texture which describes information about the part to the polygon is executed for each part, thereby generating the list image (step S3032). This texture is created in advance as transparent except the character portion (the α values of pixels included in portions except the character portion are set transparent).

With the above arrangement, operations can be executed while displaying the assembly tree during the stylus operation and confirming the hand.

The above embodiments can appropriately be combined. In this case, the processing operations in the embodiments are executed in order described above in the embodiments. When the embodiments are combined, they can be modified as needed such that processing to be executed earlier is executed earlier, as is apparent to those skilled in the art.

Other Embodiment

The object of the present invention can also be achieved by supplying a recording medium (or storage medium) which records software program codes for implementing the functions of the above-described embodiments to a system or apparatus and causing the computer (or CPU or MPU) of the system or apparatus to read out and execute the program codes stored in the recording medium. In this case, the program codes read out from the recording medium implement the functions of the above-described embodiments by themselves, and the recording medium which stores the program codes constitutes the present invention.

The functions of the above-described embodiments are implemented not only when the readout program codes are executed by the computer but also when the operating system (OS) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the recording medium, the recording medium stores program codes corresponding to the above-described flowchart (functional arrangement).

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-158025 filed on May 27, 2004 and Japanese Patent Application No. 2004-158026 filed on May 27, 2004, the entire contents of which are hereby incorporated by reference herein.

The invention claimed is:

1. An image processing method of generating a display image of a virtual space including a virtual object consisting of at least one part, comprising:
   a first acquisition step of acquiring a position and an orientation of a viewpoint of an observer;
   a second acquisition step of acquiring a position and an orientation of a pointing device;
   a specification step of specifying a part that is included in the virtual object and is designated by the pointing device, based on positions of one or more parts included in the virtual object and the position and the orientation of the pointing device;
   a calculation step of calculating a position of a list image to be laid out in the virtual space based on the positions of the viewpoint and the pointing device, wherein the calculated position of the list image is near the position of the pointing device and closer to the position of the viewpoint than that of the pointing device, wherein the list image represents information of the specified part;
   a layout step of laying out the list image at the calculated position in the virtual space;
   a virtual space image generation step of generating the display image of the virtual space, in which the laid out list image and the virtual object are included, based on the acquired position and orientation of the viewpoint; and
   a composition step of composing the generated display image of the virtual space and an image of a physical space seen in accordance with the position and the orientation of the viewpoint to display the composed image at a head mounted display mounted on the observer's head.

2. The method according to claim 1, wherein, in the layout step, the list image is laid out at the orientation of the viewpoint.

3. The method according to claim 1, wherein, in the calculation step, the position of the list image is calculated to be a position that internally divides a line segment connecting the position of the viewpoint and the position of the pointing device.

4. The method according to claim 1, further comprising a conversion step of converting the list image into a semitransparent image in accordance with an instruction to change the list image to the semitransparent image.

5. The method according to claim 1, further comprising:
   a determination step of determining based on the position and the orientation of the viewpoint and a position of the virtual object whether the virtual object is present in a direction of line of sight of the viewpoint; and
   a transparency control step of, when it is determined in the determination step that the virtual object is present, making a transparency of the list image higher than that when it is determined in the determination step that the virtual object is not present.

6. The method according to claim 1, further comprising:
   a distance calculation step of calculating a distance between the position of the pointing device and a position of the virtual object; and
   a list image generation step of generating the list image to display a list of pieces of information about parts up to a layer level corresponding to the distance calculated in the distance calculation step in a hierarchical structure of the parts included in the virtual object.

7. The method according to claim 1, wherein the specification step includes specifying a part at a position closest to the position of the pointing device acquired in the second acquisition step, and the list image is an image to display a list of pieces of information about the specified part at the position closest to the position of the pointing device acquired in the second acquisition step.

8. The method according to claim 1, wherein, in the virtual space image generation step, when the list image overlaps a hand region in the image of the physical space, the image of the virtual space is generated based on priority data to designate which of the hand region and the list image should be rendered in front.

9. The method according to claim 8, further comprising a designation step of designating which of the hand region and the list image should be rendered in front, wherein, in the designation step, designated contents are set to the priority data.

10. An image processing apparatus for generating a display image of a virtual space including a virtual object consisting of at least one part, comprising:

a first acquisition unit adapted to acquire a position and an orientation of a viewpoint of an observer;
a second acquisition unit adapted to acquire a position and an orientation of a pointing device;
a specification unit for specifying a part that is included in the virtual object and is designated by the pointing device, based on positions of one or more parts included in the virtual object and the position and the orientation of the pointing device;
a calculation unit for calculating a position of a list image to be laid out in the virtual space based on the positions of the viewpoint and the pointing device, wherein the calculated position of the list image is near the position of the pointing device and closer to the position of the viewpoint than that of the pointing device, wherein the list image represents a list of pieces of information about one or more parts, included in the virtual object;
a layout unit adapted to lay out the list image at the calculated position in the virtual space;
a virtual space image generation unit adapted to generate the display image of the virtual space, in which the laid out list image and the virtual object are included, based on the position and the orientation of the viewpoint; and
a composition unit for composing the generated display image of the virtual space and an image of a physical space seen in accordance with the position and the orientation of the viewpoint to display the composed image at a head mounted display mounted on the observer's head.

11. A non-transitory computer-readable storage medium having a program stored therein, that when executed by a computer causes the computer to perform an image processing method of generating a display image of a virtual space including a virtual object consisting of at least one part, the method comprising:
a first acquisition step of acquiring a position and an orientation of a viewpoint of an observer;
a second acquisition step of acquiring a position and an orientation of a pointing device;
a specification step of specifying a part that is included in the virtual object and is designated by the pointing device, based on positions of one or more parts included in the virtual object and the position and the orientation of the pointing device;
a calculation step of calculating a position of a list image to be laid out in the virtual space based on the positions of the viewpoint and the pointing device, wherein the calculated position of the list image is near the position of the pointing device and closer to the position of the viewpoint than that of the pointing device, wherein the list image represents information of the specified part;
a layout step of laying out the list image at the calculated position in the virtual space;
a virtual space image generation step of generating the display image of the virtual space, in which the laid out list image and the virtual object are included, based on the acquired position and orientation of the viewpoint; and
a composition step of composing the generated display image of the virtual space and an image of a physical space seen in accordance with the position and the orientation of the viewpoint to display the composed image at a head mounted display mounted on the observer's head.

* * * * *